United States Patent
Wadsworth et al.

[11] Patent Number: 5,955,174
[45] Date of Patent: Sep. 21, 1999

[54] COMPOSITE OF PLEATED AND NONWOVEN WEBS

[75] Inventors: Larry C. Wadsworth, Knoxville, Tenn.; Oldrich Jirsak, Liberec, Czech Rep.; Peter Ping-Yi Tsai, Knoxville, Tenn.

[73] Assignee: The University of Tennessee Research Corporation, Knoxville, Tenn.

[21] Appl. No.: 08/426,031

[22] Filed: Apr. 21, 1995

Related U.S. Application Data

[63] Continuation-in-part of application No. 08/411,486, Mar. 28, 1995, Pat. No. 5,686,050.

[51] Int. Cl.⁶ .................................................. B32B 3/28
[52] U.S. Cl. ........................ 428/181; 428/182; 428/186
[58] Field of Search .................................. 428/246, 284, 428/181, 186, 182

[56] References Cited

U.S. PATENT DOCUMENTS

| | | | |
|---|---|---|---|
| 1,169,428 | 1/1916 | Rogers | 361/213 |
| 1,394,064 | 10/1921 | Chapman | 361/214 |
| 2,327,695 | 8/1943 | Beregh | 175/264 |
| 2,333,213 | 11/1943 | Slayter | 175/204 |
| 2,740,184 | 4/1956 | Thomas | 28/78 |
| 2,946,541 | 7/1960 | Boyd | 244/42 |

(List continued on next page.)

FOREIGN PATENT DOCUMENTS

| | | |
|---|---|---|
| 068775 | 1/1983 | European Pat. Off. . |
| 117561 | 9/1984 | European Pat. Off. . |
| 245108 | 11/1987 | European Pat. Off. . |
| 305620 | 8/1989 | European Pat. Off. . |
| 448929 | 10/1991 | European Pat. Off. . |
| 1914780 | 10/1970 | Germany . |
| 292582 | 8/1991 | Germany . |
| 5933250 | 12/1978 | Japan . |
| 0200529 | 11/1983 | Japan . |
| 58-200529 | 11/1983 | Japan . |
| 1177374 | 8/1986 | Japan . |
| 61-177374 | 8/1986 | Japan . |
| 61-200133 | 9/1986 | Japan . |
| 622544 | 1/1987 | Japan . |
| 62-235339 | 10/1987 | Japan . |
| 0312223 | 12/1990 | Japan . |
| 2312223 | 12/1990 | Japan . |
| 4225226 | 8/1992 | Japan . |
| 480202 | 8/1975 | U.S.S.R. . |
| 1493183 | 11/1977 | United Kingdom . |
| WO 94/28568 | 12/1994 | WIPO . |

OTHER PUBLICATIONS

Adams, J., "Specialty Nonwovens with Enhanced Filtration Performance", INDA Association of the Nonwoven Fabrics Industry (Mar. 12–14–, 1991).

Ando, Katsutoshi, "Synthetic Electret Filter Media for HEPA Filtration", INDA Association of the Nonwoven Fabrics Industry (Undated).

(List continued on next page.)

*Primary Examiner*—James J. Bell
*Attorney, Agent, or Firm*—Weiser and Associates, P.C.

[57] ABSTRACT

A web or film is electrostatically charged by sequentially subjecting the web or film to a series of electric fields such that adjacent electric fields have substantially opposite polarities. Both a method and apparatus are disclosed for charging the web or film.

52 Claims, 12 Drawing Sheets

U.S. PATENT DOCUMENTS

| | | | |
|---|---|---|---|
| 2,969,463 | 1/1961 | McDonald | 250/49.5 |
| 3,067,119 | 12/1962 | Ramaika | 204/168 |
| 3,095,163 | 6/1963 | Hill | 244/12 |
| 3,111,605 | 11/1963 | Muller et al. | 361/213 |
| 3,162,398 | 12/1964 | Clauser et al. | 244/205 |
| 3,274,088 | 9/1966 | Wolinski | 204/165 |
| 3,274,090 | 9/1966 | Amborski | 204/165 |
| 3,281,347 | 10/1966 | Winder | 204/168 |
| 3,308,045 | 3/1967 | Sullivan | 204/165 |
| 3,308,344 | 3/1967 | Smith et al. | 361/213 |
| 3,360,220 | 12/1967 | Meyer | 244/42 |
| 3,503,859 | 3/1970 | Goncarovs et al. | 204/165 |
| 3,507,348 | 4/1970 | Aronson | 180/65 |
| 3,507,763 | 4/1970 | McBride | 204/169 |
| 3,510,094 | 5/1970 | Clark | 244/130 |
| 3,643,128 | 2/1972 | Testone | 244/42 |
| 3,661,735 | 5/1972 | Drelich | 204/165 |
| 3,705,844 | 12/1972 | Haas | 204/312 |
| 3,777,164 | 12/1973 | Osman | 250/531 |
| 3,959,104 | 5/1976 | Fales | 204/164 |
| 4,048,364 | 9/1977 | Harding et al. | 428/113 |
| 4,088,731 | 5/1978 | Groome | 264/282 |
| 4,215,682 | 8/1980 | Kubik et al. | 128/205.29 |
| 4,239,973 | 12/1980 | Kolbe et al. | 250/531 |
| 4,273,635 | 6/1981 | Beraud et al. | 204/165 |
| 4,284,490 | 8/1981 | Weber | 204/298 |
| 4,375,718 | 3/1983 | Wadsworth et al. | 29/592 E |
| 4,419,869 | 12/1983 | Sando et al. | 68/5 D |
| 4,426,597 | 1/1984 | Denoyer et al. | 313/231.41 |
| 4,464,223 | 8/1984 | Gorin | 156/643 |
| 4,465,547 | 8/1984 | Belke, Jr. et al. | 156/629 |
| 4,469,932 | 9/1984 | Spiegelberg et al. | 219/121 PA |
| 4,504,349 | 3/1985 | Ueno et al. | 156/272.6 |
| 4,513,049 | 4/1985 | Yamasaki et al. | 428/194 |
| 4,534,918 | 8/1985 | Forrest, Jr. | 264/22 |
| 4,576,692 | 3/1986 | Fukuta et al. | 204/165 |
| 4,588,537 | 5/1986 | Klasse et al. | 264/22 |
| 4,590,042 | 5/1986 | Drage | 422/186.06 |
| 4,592,815 | 6/1986 | Nakao | 204/165 |
| 4,626,263 | 12/1986 | Inoue et al. | 55/155 |
| 4,668,366 | 5/1987 | Zarowin | 204/192.1 |
| 4,687,573 | 8/1987 | Miller et al. | 210/143 |
| 4,771,730 | 9/1988 | Tezuka | 118/723 |
| 4,801,435 | 1/1989 | Tylko | 422/186.04 |
| 4,804,431 | 2/1989 | Ribner | 156/345 |
| 4,874,659 | 10/1989 | Ando et al. | 428/221 |
| 4,883,570 | 11/1989 | Efthimion | 204/164 |
| 4,894,131 | 1/1990 | Jacobs et al. | 204/165 |
| 4,904,174 | 2/1990 | Moosmayer et al. | 425/174.8 E |
| 4,919,968 | 4/1990 | Buhl et al. | 427/37 |
| 4,931,135 | 6/1990 | Horiuchi et al. | 156/643 |
| 4,950,531 | 8/1990 | Radwanski | 315/111.21 |
| 4,968,374 | 11/1990 | Tsukada et al. | 156/345 |
| 4,968,918 | 11/1990 | Kondo et al. | 315/111.21 |
| 4,970,104 | 11/1990 | Radwanski | 428/198 |
| 4,980,022 | 12/1990 | Fujimura et al. | 156/643 |
| 4,989,006 | 1/1991 | Roth | 342/1 |
| 4,997,600 | 3/1991 | Okumura et al. | 264/22 |
| 5,024,819 | 6/1991 | Dintner et al. | 422/186.06 |
| 5,051,159 | 9/1991 | Togashi et al. | 204/164 |
| 5,061,359 | 10/1991 | Babu et al. | 204/298.07 |
| 5,102,496 | 4/1992 | Savas | 156/643 |
| 5,116,444 | 5/1992 | Fox | 156/244.17 |
| 5,122,048 | 6/1992 | Deeds | 425/174.8 E |
| 5,124,173 | 6/1992 | Uchiyama et al. | 427/38 |
| 5,126,635 | 6/1992 | Doehler et al. | 315/111.21 |
| 5,131,992 | 7/1992 | Church et al. | 24/104 |
| 5,131,993 | 7/1992 | Suib | 24/168 |
| 5,147,493 | 9/1992 | Nishimura | 156/345 |
| 5,162,633 | 11/1992 | Sonobe et al. | 219/121.43 |
| 5,163,458 | 11/1992 | Monroe | 134/1 |
| 5,185,132 | 2/1993 | Horilke et al. | 422/186.05 |
| 5,213,658 | 5/1993 | Ishida | 156/643 |
| 5,221,427 | 6/1993 | Koinuma et al. | 156/643 |
| 5,225,659 | 7/1993 | Kusano et al. | 249/121.59 |
| 5,227,172 | 7/1993 | Deeds | 425/72.2 |
| 5,244,482 | 9/1993 | Hassenboehler, Jr. et al. | 55/528 |
| 5,252,178 | 10/1993 | Moslehi | 156/643 |
| 5,261,965 | 11/1993 | Moslehi | 134/1 |
| 5,266,153 | 11/1993 | Thomas | 156/643 |
| 5,270,137 | 12/1993 | Kubota | 429/249 |
| 5,272,417 | 12/1993 | Ohmi | 315/111.21 |
| 5,275,665 | 1/1994 | Okazaki et al. | 118/723 E |
| 5,309,063 | 5/1994 | Singh | 315/111.51 |
| 5,316,739 | 5/1994 | Yoshikawa et al. | 422/186.05 |
| 5,387,842 | 2/1995 | Roth et al. | 315/111.21 |
| 5,401,446 | 3/1995 | Tsai et al. | 264/22 |
| 5,403,453 | 4/1995 | Roth et al. | 204/164 |
| 5,414,324 | 5/1995 | Roth et al. | 315/111.21 |
| 5,415,719 | 5/1995 | Akimoto | 156/345 |
| 5,441,550 | 8/1995 | Hassenboehler, Jr. et al. | 55/486 |
| 5,443,606 | 8/1995 | Hassenboehler, Jr. et al. | 55/486 |
| 5,456,796 | 10/1995 | Gupta et al. | 156/643.1 |
| 5,456,972 | 10/1995 | Roth et al. | 428/224 |
| 5,464,499 | 11/1995 | Moslehi et al. | 216/71 |
| 5,507,874 | 4/1996 | Su et al. | 134/1 |
| 5,531,862 | 7/1996 | Otsubo et al. | 156/643.1 |

OTHER PUBLICATIONS

Denes, L. et al., "Laser Gain Characterization of Near–Atmospheric $CO_2:N_2$:He Glows in a Planar Electrode Geometry", *J. Appl. Phys.*, vol. 44, No. 9, pp. 4125–4136 (Sep., 1973).

Egitto, F. et al., "Plasma Modification of Polymer Surfaces for Adhesion Improvement", *IBM J. Res. Develop.*, vol. 38, No. 4, pp. 423–439 (Jul. 1994).

Eliasson, B. et al., "The Silent Discharge and its Application to Ozone and Excimer Formation", *Nonequilibrium Processes in Partially Ionized Gases*, pp. 401–410, Plenum Press, N.Y. (1990).

Kanazawa, S. et al., "Stable Glow Plasma at Atmospheric Pressure", *J. Phys. D: Appl. Phys.*, vol. 21, pp. 838–840 (1988).

Kanda, N. et al., "Atmospheric Pressure Glow Plasma and its Application to Surface Treatment and Film Deposition", *International Symposium on Plasma Chemistry*, Symposium Proceedings, vol. 3, Bochum, Germany (Aug. 4–9, 1991).

Kim, S., "Surface Modification of Polypropylene in an Impulse Corona Discharge", *Korean Journal of Chemical Engineering* 13(1), pp. 97–100 (1996).

Kogoma, M. et al., "Wettability Control of a Plastic Surface by $CF_4-O_2$ Plasma and Its Etching Effect", *J. Phys. D: Appl. Phys.*, vol. 20 (1987).

Liu, C., "Plasma–Related Characteristics of a Steady–State Glow Discharge at Atmospheric Pressure", Presented at the 1993 Sigma XI Graduate Student Paper Comp. The Univ. of Tennessee, Knoxville, TN (Mar. 4, 1993).

Liu, C. and Roth, J.R., "Characteristics of a Steady–State, Low Power Glow Discharge at Atmospheric Pressure", *Bulletin of the Am. Phys. Society, Series II*, vol. 37, No. 6, p 1563 et seq. (Nov., 1992).

Malik, M.R. et al., "Ion Wind Drag Reduction", AIAA 21st Aerospace Sciences Meeting (AIAA–83–0231), Reno, Nevada (Jan. 10–13, 1983).

Prinz, E. et al., "Verbundprojekt: Oberflachenbeschichtung mit transienten Glimmentladungen bei Atmospharendruk--Teilvorhaben: Up-scaling der Grundsatzuntersuchung an Iaufenden Kunststoffbahmen", Statusseminar, Oberflachen-un Schichttechnologien, Mainz, Germany (May 29-31, 1995).

Rakowski, W., "Plasma Modification of Wool Under Industrial Conditions", Melliand Textilberichte, vol. 70, pp. 780-785 (1989).

Rakowski, W., "Effect and Cost of Plasma Treatment of Polypropylene Melt Blown Webs", Second Annual TANDEC Conference (Oct. 13-16, 1992).

Reitz, H. et al., "Power Modulation for Dielectric Barrier--Discharges", Paper presented at Twentieth Power Modulator Symposium (1992).

Roth, J.R. et al., "Experimental Generation of a Steady-State Glow Discharge at Atmospheric Pressure", 1992 (19th) IEEE Int. Conference on Plasma Science, Conference Record-Abstracts, Paper 5P-21, IEEE Catalog No. 92-TH0460-6, ISBN 0-7803-0716-X, pp. 170-171, Tampa, FL (Jun. 1-3, 1992).

Roth J.R. et al., "Plasma-Related Characteristics of a Steady-State Glow Discharge at Atmospheric Pressure", Paper 2P-18, Proc. 1993 IEEE Int. Conf. on Plasma Science, Vancouver, B.C. IEEE Catalog No. 93-CH3334-0, ISBN 0-7803-1360-7, p. 129 (1993).

Roth, J.R. et al., "Preliminary Measurements of the Plasma Properties of a One Atmospher Glow Discharge Plasma", Paper presented at 35th Ann. Meeting of APS Div. of Plasma Physics, APS Bulletin, Series II, vol. 38, No. 10, No. 10, p. 1901, St. Louis, MO (Nov. 1-5, 1993).

Salge, J., "Plasma-Assisted Deposition at Atmospheric Pressure", *Journal of De Physique IV*, Symposium C5-583, Supplement to Journal de Physique II, vol. 5 (Jun., 1995).

Salge, J. et al., "Verbundproject: Oberflachenbeschichtung mit transienten Gimmentladungen bei Atmospharendruck Teilvorhaben: Grundsatzuntersuchungen" Institut fur Hochspannungstechnik, TU Braunschweig, Germany (1996).

Sawada, Y. et al., "A New Approach to the Copper/Epoxy Joint Using Atmospheric Pressure Glow Discharge", *J. Adhesion*, vol. 53, pp. 173-182 (1995).

Schwab, H., "Some Properties of Radio Frequency Gas Discharges in Air at Atmospheric Pressure", *Proceedings of the IEEE*, vol. 59, No. 4 (Apr., 1971).

Szucht, E., "contribution to the Production of Melt-Blown Nonwovens", Melliand English—Translation of Milliland Textiberichte 72, p. 270 (Apr., 1991).

Van Turnhout, Jr., "Electret Filters for High-Efficiency Air Cleaning", *Journal of Electrostatics*, 8, pp. 369-379 (1980).

Von Engel, A. et al., "On the Glow Discharge At High Pressure", *Ziet, fur Physik*, vol. 85, pp. 144-160 (1993); including an English language translation of the original German text.

Wakida, T. et al., "Changes in Surface Properties of Poly(ethylene terephthalate) Treated with Low Temperature Plasma: Effect of Pretreatment with Dimehtylformamide", Sen-I Gakkaishi, vol. 42, No. 2 (1986).

Wakida, T. et al., "Surface Free Energy of Poly(ethylene Terephthalate) and Nylon 6 Films Treated With Low Temperature Plasma", *Sen-I Gakkaishi*, vol. 43, No. 7 (1987).

Wood, O.R. et al., "High-Pressure Laser Action in 13 Gases with Transverse Excitation", *Applied Physics Letters*, vol. 18, No. 4, pp. 112-115 Feb. 15, 1971).

Yokoyama, T. et al., "The Mechanism of the Stabilization of Glow Plasma at Atmospheric Pressure", *J. Physics D.: Appl. Phys.*, vol. 23, pp. 1125-1128 (1990).

COMPOSITE OF PLEATED AND NONWOVEN WEBS

RELATED CASES

This is a continuation-in-part of U.S. patent application Ser. No. 08/411,486, filed Mar. 28, 1995 now U.S. Pat. No. 5,686,050. The application is incorporated herein in its entirety by reference.

FIELD OF THE INVENTION

The present invention relates to novel composite webs of pleated and unpleated carded webs with nonwoven webs such as meltblown webs of synthetic thermoplastic fibers. The invention also relates to such composites which are cold electrostatically charged and to the process of so charging.

BACKGROUND OF THE INVENTION

Electrically charged fibrous materials to be used as a filtration medium have been known for some time. The prior art and its shortcomings are reviewed in the patent identified above.

The currently available methods for cold charging a web also have problems developing the desired charge densities and, in addition, suffer from the added problem of having the charge bleed off the web with time.

SUMMARY OF THE INVENTION

It is an object of the present invention to provide novel composite structures which are pleated or nonpleated carded webs co-formed into a porous composite with nonwoven webs.

It is a further object of the present invention to provide a method and apparatus for electrostatically charging such composite structures.

These and other objects which will become apparent to one skilled in this art are achieved by the discovery of novel composite web structures comprising pleated or unpleated carded webs with nonwoven webs.

The carded webs and the nonwoven components of the composites of the invention can be held together as laminated structures by various means such as heat fusion (e.g., at discrete points) of fibers having a lower melting point than the melting point of the remaining webs. Alternatively, one or more webs can be provided at appropriate selected positions between adjacent layers of the composite structure, which upon the application of heat, will likewise provide a satisfactory adhesive bond. The composites of the invention are of various configurations, and are particularly useful as filtration devices of various media including gases and liquids. When electrostatically treated, these filtration properties are further and remarkably increased.

Webs that are produced by the methods and apparatus of the present invention have relatively high charge densities and if the composites contain conductive films or fibers, they do not exhibit attendant surface static electrical charge which would be inappropriate for use in combustible environments.

For the purposes of the discussion in connection with the electrostatic charging which is to follow and for use in the claims, the terms "positive" and "negative" are meant to be relative terms. For example, a pair of electrodes will have a positive electrode and a negative electrode any time there is a difference in potential between the two electrodes. The positive electrode, for the purposes of this discussion, will be the electrode with the more positive (or less negative) potential, while the negative electrode will be the electrode with the more negative (or less positive) potential.

Also, it is well known to practitioners in the art that the techniques for charging webs may be effectively used to charge films and vice versa. Therefore, for purposes of the discussion which is to follow and for use in the claims, the terms "web" and "film" which preferably for the principal intended uses are permeable or porous to the medium to be filtered. These terms will be considered to be interchangeable and will be generically referred to by the term "web".

The present invention provides a method for charging a composite by the methods and the apparatus described in the aforemost mentioned patent and patent application.

The present invention is suitable for charging the multilayer composite of the invention made of generally nonconductive polymeric materials. The composites of the nonwoven component and the carded web may be made from many of the thermoplastics capable of being meltblown (or spunbond). The thermoplastic resins useable in the production of nonwovens are known and include polyolefins (elastomeric or nonelastomeric) such as polyethylene, polypropylene including high density polyethylene, ethylene copolymers (including EVA and EMA copolymers with high tensile moduli), nylon, polyamides, polyesters, polystyrene, poly-4-methylpentene-1, polymethylmethacrylate, polytrifluorochlorethylene, polyurethanes, polycarbonates, silicones, polyphenylene sulfide. The fibers constituting the composites are generally hydrophobic, but may be a mixture of hydrophobic and hydrophilic polymeric (synthetic) materials which, overall, have hydrophobic characteristics. The mixture may include layers of different hydrophobic and hydrophilic properties, or the fibers of such different properties may be commingled or intertwined (i.e., mixed). A favored class of polymers includes polypropylene (PP), recycled and virgin polyethylene terephthalate (PET), all types of polyethylene (PE), such as linear low density polyethylene (LLDPE), polybutylene terephthalate (PBT), polycarbonates, polychlorotrifluoroethylene (PCTFE), and polycyclohexyldimethylene terephthalate (PCT).

In accordance with the present invention, the components may contain both conductive and nonconductive fibers such as meltblown/cotton/meltblown thermally bonded webs or meltblown/cotton hydroentangled or needle-punched webs, or hydroentangled mixtures of carded polyester staple fibers and wood tissue, such as SONTARA webs (Du Pont), as well as deep-grooved polyester fibers such as 4DG fibers (Eastman Chemical Company).

The composite webs (and the laminates) of the invention may contain one or more layers of cellulosic fibers like cotton, ramie, hemp, jute, flax, kenaf, bagasse, and eucalyptus, including derivatives of cellulose such as rayon, or many others, as well as "Tencel", a comparatively new fiber of Courtaulds P.C. (made from wood pulp). The composite may include staple fibers (i.e., natural fiber (as of raw wool, cotton, flax, or hemp) or synthetic fibers (as cut from continuous filaments of rayon or nylon) of relatively short length that when spun and twisted forms a yarn as distinguished from a filament).

In a preferred embodiment of the invention the composite web is comprised of two layers including a first layer formed of a carded web and folded to define a series of pleats, and a second layer formed of a nonwoven web and including a planar surface, wherein the pleats of the first layer are attached to the planar surface of the nonwoven web. Preferably, the carded web is comprised of a blend of fibers including polypropylene, polyethylene, or polyester fibers. Preferably also, the polyolefins are meltblown like of polypropylene and the nonwoven web can be a needlepunched nonwoven web. The first and second layer or when more than two layers are used are heat bonded by a fiber which has a fusion point below that of the other fibers in the composite or by a web of such fibers which performs as an adhesive web. When a composite comprises a third layer which is generally planar, the pleats of the first layer are attached to the planar surface of the nonwoven web, as by heat bonding. In another preferred configuration, the third layer is formed of a carded web and folded to form a series of pleats, wherein the pleats of the third layer are attached to a surface of the nonwoven web opposing the planar surface which receives the first layer. This structure may include a scrim layer which has a generally planar surface, wherein the pleats of the first layer are attached as by heat bonding to the planar surface of the scrim layer.

In a more preferred embodiment of the invention, all of these, as well as other configurations of the composites (and different compositions or constituents therefor) are electrostatically charged composites. The filtration properties of these charged composites are remarkably improved.

BRIEF DESCRIPTION OF THE DRAWINGS

For further detail regarding the improvements of the present invention, reference is made to the following detailed description of exemplary embodiments, in conjunction with the accompanying drawings in which.

DETAILED DESCRIPTION OF THE INVENTION

In the description which follows the term "web" has been used for consistency and convenience, in place of terms such as "composite web" or "folded composite" or other terminology conventionally used in this art.

Figure 1:
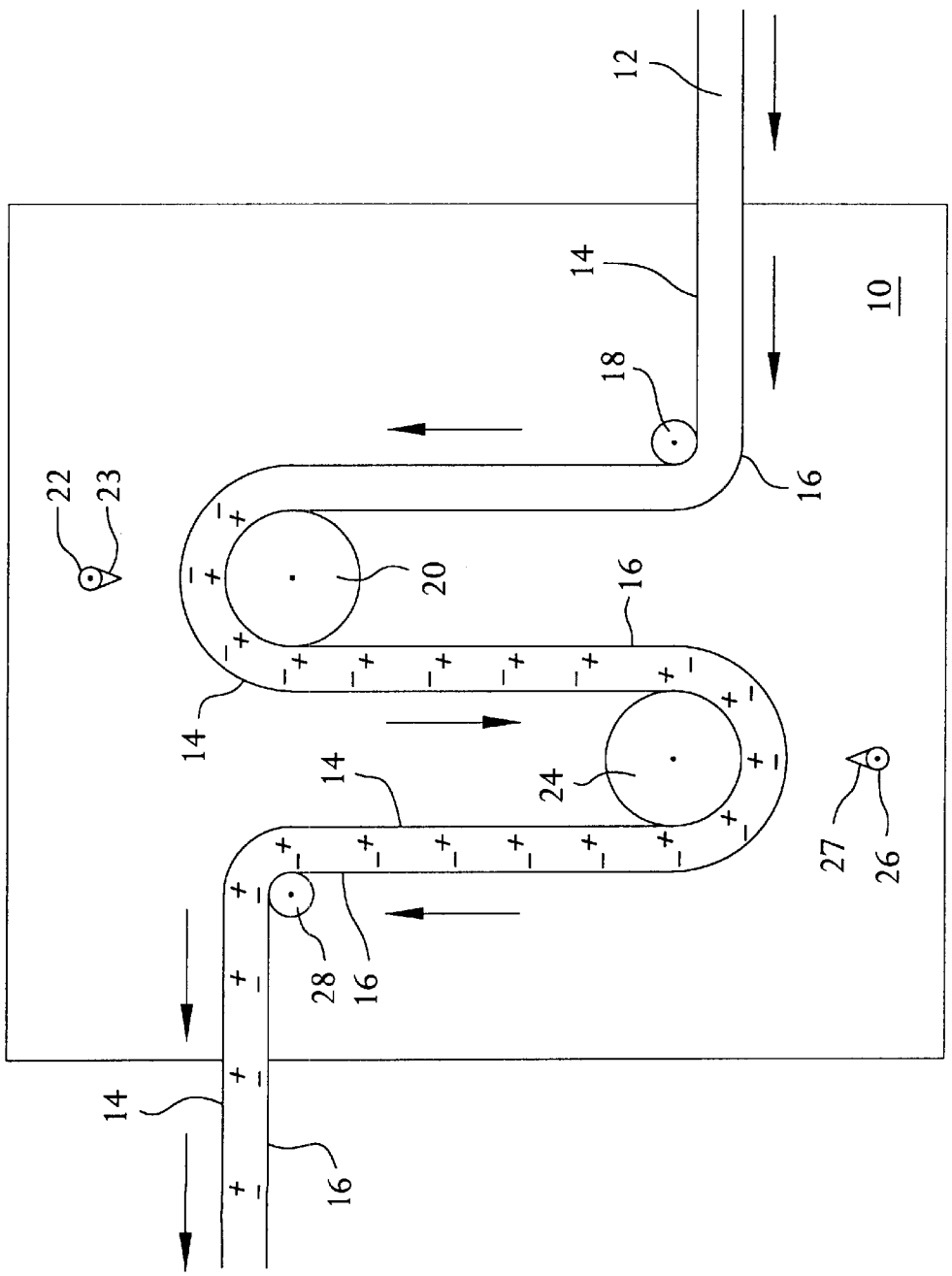
FIG. 1 is a schematic view of one embodiment of the present invention for cold charging a web.

Referring now to the drawings in which like reference characters designate like or corresponding parts throughout the several views, FIG. 1 shows an embodiment of an apparatus 10 for cold charging a web in accordance with the present invention. The depicted apparatus 10 generally comprises an uncharged moving web 12 having a first side 14 and a second side 16. The web 12 may have a triboelectric charge associated with the relative inherent electronegative/electropositive nature of the polymer. In addition, the web 12 may be a web that has been precharged by either a hot or cold charging process. The web 12 passes into the apparatus 10 with the first side 14 in contact with positioning roller 18. The second side 16 of the web 12 then comes in contact with the first charging drum 20 which rotates with the web 12 and brings the web 12 into a position between the first charging drum 20 and a first charging bar 22.

In the following discussion, the first charging drum 20 is assumed to be "negatively charged" (i.e., at a negative potential) and the first charging bar 22 is assumed to be "positively charged" (i.e., at a positive potential). These assumptions are for the ease of describing the operation of the invention only and are not intended to limit the scope of the invention to those specific relative potentials.

As the web 12 passes between the charging bar 22 and the charging drum 20, an electrostatic charge is developed adjacent the two sides 14 and 16 of the web 12. A relative negative charge is developed adjacent the first side 14 of the web 12 and a relative positive charge is developed adjacent the second side 16 of the web 12. The web 12 then passes on to a "negatively charged" (i.e., at a negative potential) second charging drum 24 and, further, to a position between the charging drum 24 and a second "positively charged" (i.e., at a positive potential) charging bar 26 where the web 12 has the polarity of its charge reversed. This effect is seen in polyolefin fibers but is not always seen in webs prepared from fibers of, for example, polyesters or PCTFE. That is, a relative positive charge is developed adjacent the first side 14 of the web 12 and a relative negative charge is developed adjacent the second side 16 of the web 12. The charged web 12 then passes on to a positioning roller 28 and out of the apparatus.

For the charging of webs, both of the charging drums 20 and 24 are held at a relative negative charge (or grounded) while the charging bars 22 and 26 are held at a relative positive charge. However, since different sides of the web 12 are in contact with the charging drums (the second side 16 is in contact with the first charging drum 20 and the first side 14 is in contact with the second charging drum 24) the charges adjacent to the sides 14 and 16 of the web 12 are changed during the charging of the web 12 in the apparatus 10. Thus, the first side 14 is first negatively charged and then positively charged, and the second side is first positively charged and then negatively charged.

Without being bound by theory, it is believed that the switch in polarity of the charges adjacent to the sides 14 and 16 of the web 12 contributes to an improvement in the charge density of the charged web as well as an improvement in the lifetime of the charge in the web. The specific reasons for this observed improvement are currently unknown to the inventors.

Figure 2:
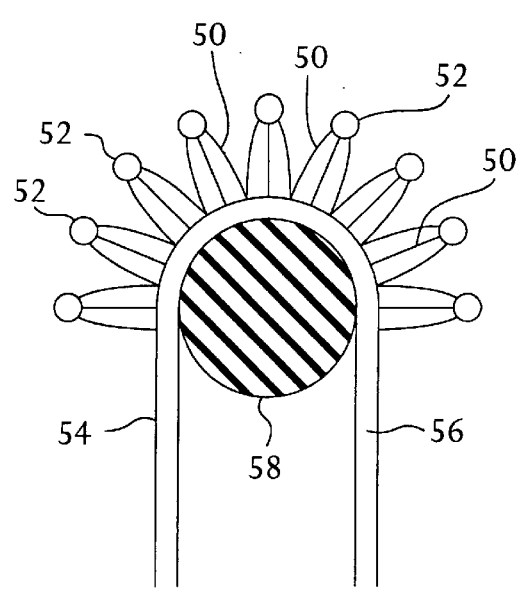
FIG. 2 is a schematic view showing the electrical fields of a method for cold charging a web according to the prior art.

The charging seen when using an apparatus as shown in FIG. 1 is in contrast to the charging of a web according to the prior art as illustrated by U.S. Pat. No. 4,592,815 to Nakao. The apparatus shown in U.S. Pat. No. 4,592,815 charges a web by placing it in contact with a drum and beneath a series of charging bars arranged in a circular pattern about the drum. The bars are charged and the drum is maintained at a ground. As is shown in FIG. 2, the electrical fields 50 from the charging bars 52 are driven together near the surface 54 of the web 56 and the drum 58. Thus, the fields 50 are very concentrated near the surface 54 of the web 56. Even at low electric field levels, the concentration of electric field 50 near the surface 54 of the web 56 may be sufficient to cause arcing from the charging bars 52 to the drum 58. Thus, it is often difficult to produce a web by the method of U.S. Pat. No. 4,592,815 without grounding the drum or cylinder.

Figure 3:
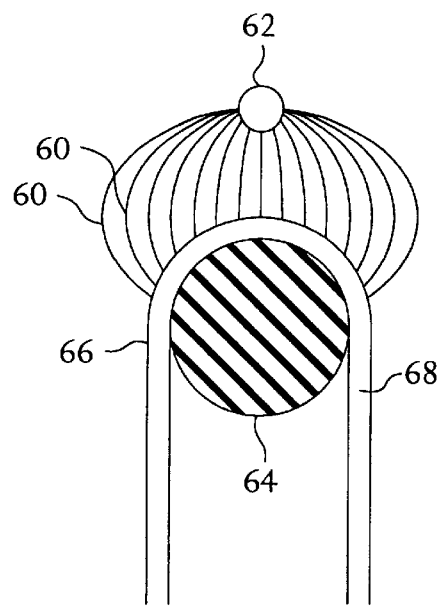
FIG. 3 is a schematic view showing the electrical fields of a method for cold charging a web according to the apparatus shown in FIG. 1.

In contrast, the present method, as illustrated in the apparatus of FIG. 1, produces webs without the need to ground the drum. As is shown in FIG. 3, the electric field 60 between the single charging bar 62 and the drum 64 is more spread out across the surface 66 of the web 68. The metal or otherwise conductive drum or roller 64 may be either grounded (as in U.S. Pat. No. 4,592,815) or biased. A bias on the drum 64 is used to control the polarity and charge density on both sides of the web 68. Hence, the filtration efficiency and charge retention of the web are improved.

Figure 4:
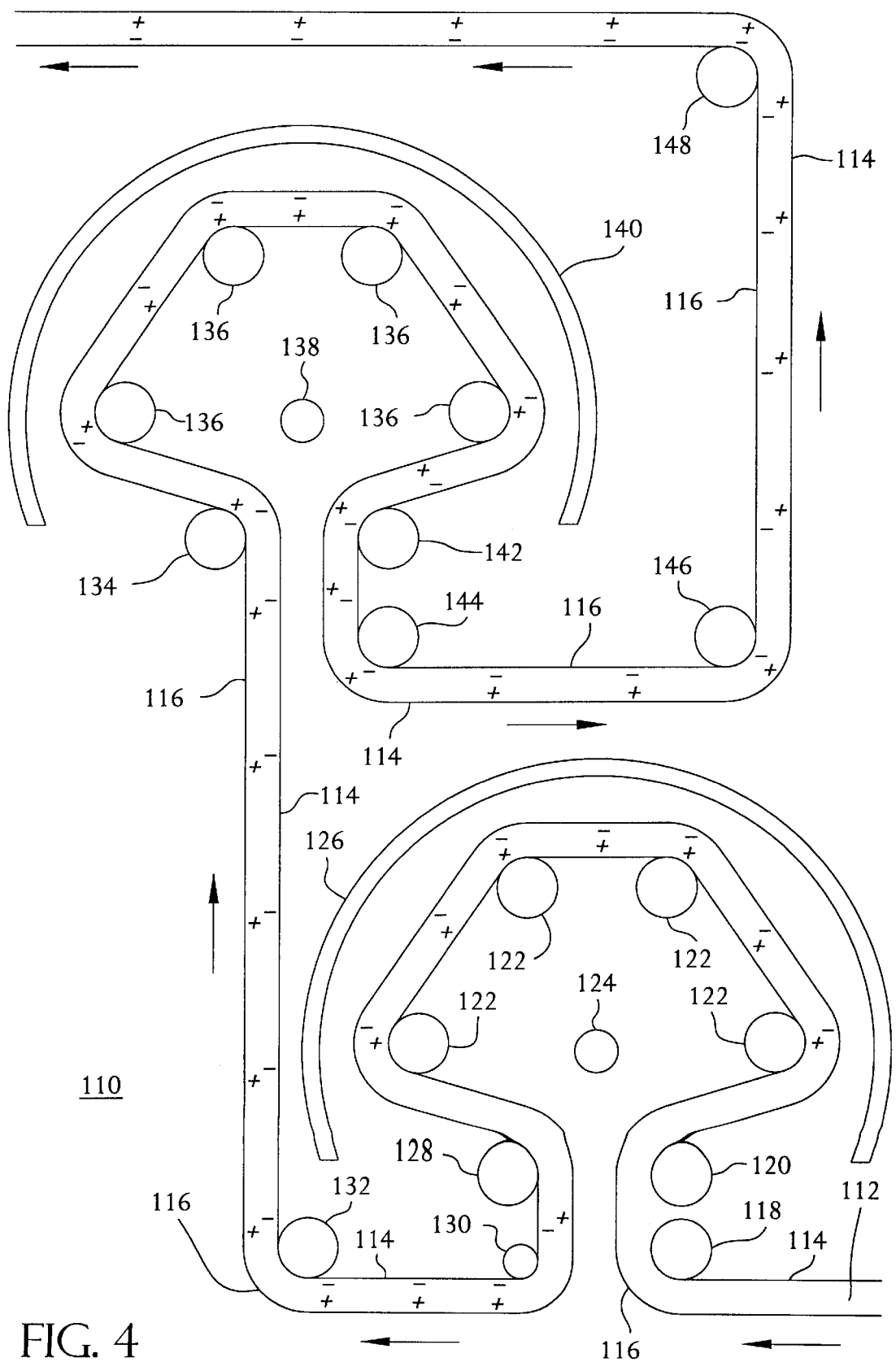
FIG. 4 is a schematic view of another embodiment of the present invention for cold charging a web.

Another embodiment is shown in FIG. 4 which shows an alternate apparatus 110 for cold charging a web in accordance with the present invention. The depicted apparatus 110 generally comprises an uncharged moving web 112 having a first side 114 and a second side 116. The web 112 may have a triboelectric charge associated with the relative inherent electronegative/electropositive nature of the polymer. In addition, the web 112 may be a web that has been precharged by either a hot or cold charging process. The uncharged web 112 passes into the apparatus 110 with the first side 114 in contact with a first positioning roller 118. The web 112 then passes over a second positioning roller 120 and onto first insulating positioning rollers 122 which position the web 112 between the first charging wire 124 and the first charging shell 126. The rollers 122 are generally made of insulating materials such as wood, plastic, or ceramic.

In the following discussion, the first charging wire 124 is assumed to be "negatively charged" (i.e., at a negative potential) and the first charging shell 126 is assumed to be positively charged (i,e., at a positive potential). These assumptions are for the ease of describing the operation of the invention only and are not intended to limit the scope of the invention to those specific relative potentials.

The charges on the first charging wire 124 and the first charging shell 126 induce a charge in the web 112 such that there is a relative positive charge adjacent the second side 116 of the web 112 and a relative negative charge adjacent the first side 114 of the web 112.

The web 112 then passes on to third, fourth, fifth, and sixth positioning rollers 128–134 before passing onto second insulating positioning rollers 136 which position the web 112 between the second charging wire 138 and the second charging shell 140. Again, the rollers 136 are generally made of insulating materials such as wood, plastic, or ceramic.

The charges (i.e., potentials) on the second charging wire 138 and the second charging shell 140 induce a change in the polarity of the charge in the web 112 such that there is a relative negative charge adjacent the second side 116 of the web 112 and a relative positive charge adjacent the first side 114 of the web 112. The web 112 then passes over the positioning rollers 142–148 and out of the apparatus 110.

As in the apparatus 10 described in FIG. 1, the apparatus 110 of FIG. 4 provides a web which has had the polarity of its charge changed during the charging process. Again, the resulting web retains a long lasting high charge density. This is shown in the increase and the relative stability of the filtration efficiency of webs treated according to the present invention.

Figure 5:
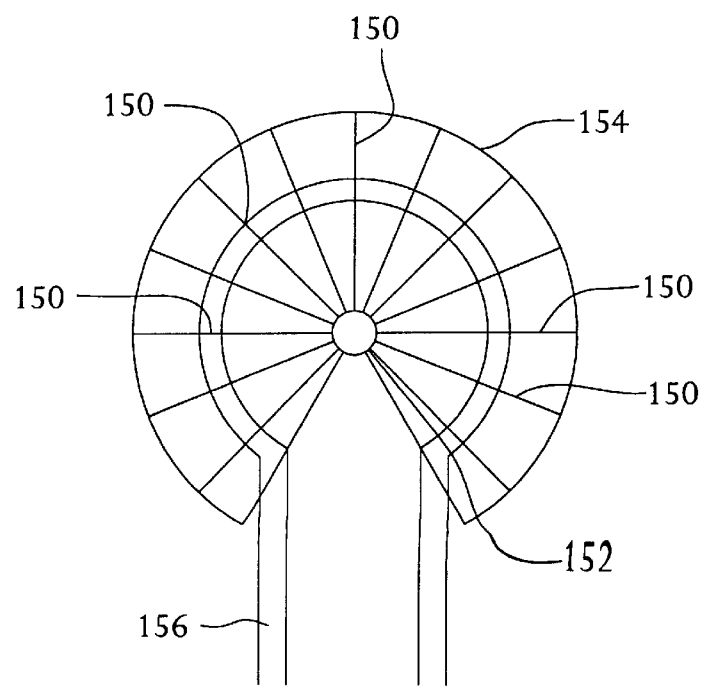
FIG. 5 is a schematic view showing the electrical fields of a method for cold charging a web according to the apparatus shown in FIG. 4.

Again, there is a general decrease in the number and size of pinholes (due to arcing between the drum and the charging bar) in the charged web. As in the apparatus shown in FIG. 1, the apparatus shown in FIG. 4 has a dispersed electric field. As is shown in FIG. 5, the electric field lines 150 from the charging bar 152 to the shell 154 are spread across a rather wide area.

Figure 6:
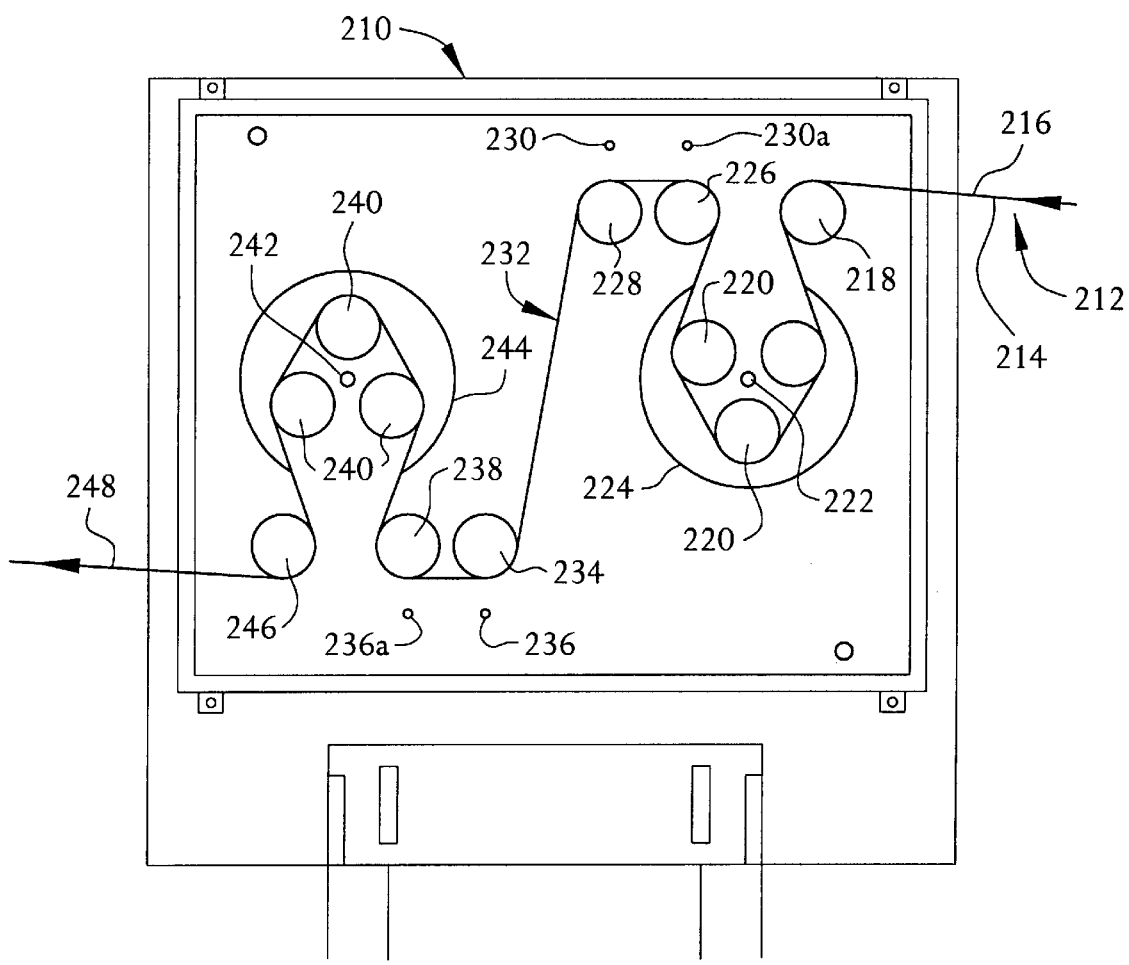
FIG. 6 is a schematic view of an embodiment of the present invention for cold charging a web which permits varied charging of the web using different processes, both alone and in combination.

FIG. 6 shows yet another alternative apparatus 210 for cold charging a web in accordance with the present invention. The apparatus 210 is configured to charge webs using charging techniques which can vary, as desired. This can include the charging of webs with a biased metal or otherwise conductive drum or roller together with a biased or grounded charging bar, similar to the charging technique discussed in conjunction with FIG. 1 of the drawings. This can also include the charging of webs with a charging bar and a charging shell substantially surrounding and apart from the charging bar, similar to the charging technique discussed in conjunction with FIG. 4 of the drawings. This can even include desired combinations of these two charging techniques. Essentially, this is accomplished by activating or deactivating (or connecting or disconnecting) desired sections of the apparatus 210 to achieve the charging technique which is desired.

The apparatus 210 operates upon an uncharged moving web 212 having a first side 214 and a second side 216. The uncharged web 212 enters the apparatus 210, coming into contact with a first positioning roller 218, which may be either an insulative or conductive roller. The web 212 is then passed to a series of insulating positioning rollers 220 which position the web 212 between a charging wire 222 and a first charging shell 224. The web 212 is then passed over a positioning roller 226, and is caused to contact a first charging drum 228, which must be conductive. A charging bar 230 is operatively combined with the charging drum 228.

Following a transition, at 232, the web 212 is caused to contact a second charging drum 234. A charging bar 236 is operatively combined with the charging drum 234, which is conductive. The web 212 is then passed over a positioning roller 238, and is in turn directed to a series of positioning insulating rollers 240 which position the web 212 between a charging wire 242 and a second charging shell 244. Following this, the web 212 is passed over a positioning roller 246, which may be either conductive or nonconductive, and is directed from the apparatus 210, at 248.

It will be appreciated that the apparatus 210 essentially constitutes an operative combination of an apparatus in accordance with FIG. 1 of the drawings (herein referred to as "Technique I"), and an apparatus in accordance with FIG. 4 of the drawings (herein referred to as "Technique II"). Through selective use of the four sections represented by the charging wire 222 and the charging shell 224, the charging bar 230 and the charging drum 228, the charging bar 236 and the charging drum 234, and the charging wire 242 and the charging shell 244, various combinations of the techniques previously described for cold charging a web of material may be developed. This allows the charging technique to be tailored to the type of web (e.g., material, thickness, etc.) which is to be operated upon.

For example, it has been found that relatively thin webs can be more efficiently charged with an apparatus according to FIG. 1 (Technique I). This is achievable by activating the charging bars 230, 236 and the conductive charging drums 228, 234. It has been found that relatively thick webs can be more efficiently charged with an apparatus according to FIG. 4 (Technique II). This is achievable by activating the charging wires 222, 242 and the charging shells 224, 244. It has even been found that combinations of the techniques represented by FIG. 1 and FIG. 4 of the drawings (herein referred to as "Technique III") are useful in certain circumstances. For example, it has been found that thin polypropylene webs (on the order of 20 g/m² or less) will show a particularly enhanced filtration efficiency (on the order of 91.69%) if charged with a combination of the techniques represented by FIG. 1 and FIG. 4 (Technique III). Referring again to FIG. 6, this is achievable by activating the charging wires 222, 242 and the charging bars 230, 236, as well as the charging shells 224, 244 and the charging drums 228, 234, to achieve a charging of the web 212 through combination of the techniques previously described. Alternatively, for certain webs, it has been found to be advantageous to use an apparatus including only one component of an apparatus according to FIG. 1 (Technique I) and only one component of an apparatus according to FIG. 4 (Technique II). Again referring to FIG. 6, and as an example, such an apparatus could include a combination of the charging bar 222 and the charging shell 224, and the charging wire 230 and the charging drum 228. For further flexibility in charging of the web 212, the apparatus 210 can include additional charging wires 230a, 236a associated with corresponding charging drums (in place of the rollers 226, 238), if desired.

The ability to vary charging technique has revealed yet other improvements in implementation. For example, it has been found that when laminated (multilayer) webs are charged with the technique represented by FIG. 1 (Technique I), and the technique represented by FIG. 4 (Technique II), different characteristics result in terms of the filtration efficiency of each of the layers associated with the treated laminated web.

Table I illustrates such variation for webs having three layers, five layers and eight layers, respectively.

Definitions

In order to better understand the terms used herein, including the Tables and Examples to be set forth below, the following definitions consistent with the accepted technical definitions in the industry, are submitted.

Filtration Efficiency—is the measure of the ability of a web to remove particles from a flow of (gaseous or liquid) fluid. The filtration efficiency is related to the penetration ability, P, of small particles and is calculated as:

filtration efficiency=(100−P)%.

Filter Quality—is another measure of the ability of a web to remove particles from a flow of (gaseous or liquid) fluid. The filter quality, $q_F$, is related to the particle penetration through a web, P and to the pressure drop across the web, Δp, according to the formula:

$q_F=[\ln(1/P)]/[\Delta p]$.

See William C. Hinds, "Aerosol Technology: Properties, Behavior, and Measurement of Airborne Particles," John Wiley & Sons, New York, p. 170 (1982).

TABLE I

| No. | | I[a] | | II[b] | | III[c] | | IV[d] | |
|---|---|---|---|---|---|---|---|---|---|
| Number of Layers | | 3 | 3 | 5 | 5 | 5 | 5 | 8 | 8 |
| Charging Tech. | | I | II | I | II | I | II | I | II |
| Overall | Filt. Eff. | 98.6 | 99.92 | 98.60 | 99.957 | 94.70 | 94.64 | 99.022 | 99.9771 |
| | Δp | 6.9 | 6.9 | 7.2 | 7.4 | 2.4 | 2.3 | 7.7 | 7.4 |
| 1st Layer | Filt. Eff. | 88.2 | 88.9 | 73.5 | 80.4 | 53.35 | 43.5 | 51.1 | 59.4 |
| | Δp | 2.4 | 2.2 | 1.4 | 1.6 | 0.6 | 0.6 | 1.1 | 1.1 |
| 2nd Layer | Filt. Eff. | 60.6 | 90.8 | 56.9 | 80.2 | 48.2 | 50.95 | 49.1 | 65.8 |
| | Δp | 2.3 | 2.3 | 1.6 | 1.5 | 0.6 | 0.6 | 1.1 | 1.1 |
| 3rd Layer | Filt. Eff. | 82.3 | 88.5 | 47.1 | 85.2 | 49.75 | 50.7 | 33.6 | 74.8 |
| | Δp | 2.3 | 2.1 | 1.5 | 1.7 | 0.6 | 0.5 | 1.1 | 1.2 |
| 4th Layer | Filt. Eff. | | | 54.5 | 82.9 | 45.9 | 51.4 | 32.8 | 74.6 |
| | Δp | | | 1.6 | 1.6 | 0.5 | 0.6 | 1.1 | 1.2 |
| 5th Layer | Filt. Eff. | | | 67.2 | 83.3 | | 46.5 | 33.5 | 71.9 |
| | Δp | | | 1.5 | 1.7 | | 0.6 | 1.1 | 1.1 |
| 6th Layer | Filt. Eff. | | | | | | | 34.3 | 71.3 |
| | Δp | | | | | | | 1.1 | 1.2 |
| 7th Layer | Filt. Eff. | | | | | | | 58.0 | 70.3 |
| | Δp | | | | | | | 1.1 | 1.1 |
| 8th Layer | Filt. Eff. | | | | | | | 54.3 | 73.5 |
| | Δp | | | | | | | 1.1 | 1.2 |

[a]0.9 oz/yd² layers, thickness of each layer is 214 μm (for a single layer, typical filt. eff. = 53.9, typical Δp = 2.4).
[b]0.9 oz/yd² layers, thickness of each layer is 281 μm (for a single layer, typical filt. eff. = 32.6, typical Δp = 1.5).
[c]0.9 oz/yd² layers, thickness of each layer is 550 μm (for a single layer, typical filt. eff. = 14.5, typical Δp = 0.55).
[d]0.39 oz/yd² layers, thickness of each layer is 205 μm (for a single layer, typical filt. eff. = 27.5, typical Δp = 0.95).

Table I shows that laminated webs treated according to FIG. 1 of the drawings (Technique I) exhibit higher filtration efficiencies for outside layers than for inside layers, while the opposite result is observed for laminated webs treated according to FIG. 4 of the drawings (Technique II).

In order to provide a further understanding of the present invention, the following examples primarily illustrate certain more specific details thereof.

Equipment

Filtration Measurement: A TSI Model 8110 automated filter tester was used for the measurement of media filtration efficiency. Two percent sodium chloride solution (20 g NaCl in 1 liter of water) was aerosolized by an aerosol generator. The NaCl/water drops in aerosol were heated and NaCl crystallites with a 0.1 μm diameter were formed. The mass concentration of NaCl in the air was 101 mg/m³. Photometry was used to detect the volume concentration of the air in the upstream volume of the media ($C_u$) and the volume concentration of the air in the downstream volume of the media ($C_d$). The penetration ability of the NaCl particles was calculated as:

$$\text{penetration} = P = [C_d/C_u](100\%),$$

and filtration efficiency was calculated as:

$$\text{filtration efficiency} = (100-P)\%.$$

Surface Charge Potential: A Monroe Model 244 Isoprobe Electrostatic Voltmeter with a 1017E Probe (0.07 in. opening) was connected to a Velmex system which allows webs with dimensions up to 20×38 inches to be scanned with the probe in both the machine (MD) and cross-machine (CD) directions. The measurement system was interfaced with an IBM AT computer using DT 2801 I/O system (Data Translation Inc., Marlborough, Mass.). The average and standard deviation of scanned data were simultaneously computed along with the absolute average (the average of the absolute value of the surface charge potential).

EXAMPLE I

Cold Charging using Contact Cloth: Table II lists the conditions and charging results for a variety of webs charged according to the method disclosed in U.S. Pat. No. 4,375,718 to Wadsworth, et al., which is incorporated herein by reference. Table III lists the measured surface charge potential for those webs.

TABLE II

| No.[a] | Filt. Eff.[b] | Charging Voltage[c] | Filt. Eff.[d] | Δp | $q_r$ |
|---|---|---|---|---|---|
| 1 | 11.2 | −20, +20 | 63.30 | 0.9 | 1.176 |
| 2 | 45.7 | −20, +20 | 98.708 | 2.2 | 1.977 |
| 3 | 45.83 | −20, +20 | 98.426 | 1.9 | 2.386 |

TABLE II-continued

| No.[a] | Filt. Eff.[b] | Charging Voltage[c] | Filt. Eff.[d] | Δp | $q_r$ |
|---|---|---|---|---|---|
| 4 | 43.5 | −20, +20 | 99.000 | 2.1 | 2.193 |
| 5 | 24.55 | −20, +20 | 84.775 | 0.9 | 2.091 |
| 6 | 41.55 | −18.5, +20 | 98.460 | 2.45 | 1.703 |
| 7 | 71.65 | −21, +21 | 99.937 | 6.8 | 1.084 |

[a]1 is 1 oz/yd² LLDPE; 2 is 1 oz/yd² PP with 10% PP grafted with 6% acrylic acid; 3 is 2 oz/yd² recycled PET; 4 is 1 oz/yd² PCT; 5 is 1 oz/yd² recycled PET; 6 is 1 oz/yd² PP; 7 is 3 oz/yd² PP.
[b]Before charging.
[c]kV for top, bottom.
[d]After charging.
[e]mm of H₂O.

TABLE III

| | Surface Charge Potentials | | | |
|---|---|---|---|---|
| | Screen Side | | Face Side | |
| No.[a] | Arith. Avg. | Abs. Avg. | Arith. Avg. | Abs. Avg. |
| 1 | +206 | 323 | −345 | 360 |
| 2 | +26 | 318 | −99 | 175 |
| 3 | −50 | 456 | +70 | 292 |
| 4 | −207 | 609 | +1031 | 1031 |
| 5 | +137 | 263 | +231 | 425 |
| 6 | +327 | 355 | −153 | 238 |
| 7 | +468 | 1081 | −790 | 878 |

[a]Same samples as in Table II.

Table II shows how the filtering efficiency of various webs can be improved by cold charging according to U.S. Pat. No. 4,375,718. As is shown in Table III, the charging of the webs by the method mostly produces bipolar (i.e., different charges on opposite sides) webs.

EXAMPLE II

Cold Charging using the Apparatus of FIG. 1: Table IV lists the conditions and charging results for a variety of webs charged on an apparatus according to FIG. 1 (Technique I). Table V lists the measured surface charge potential for those webs.

TABLE IV

| No.[a] | Filt. Eff.[b] | Charging Voltage[c] | Filt. Eff.[d] | Δp | $q_F$ |
|---|---|---|---|---|---|
| 8 | 71.65 | +20 (charged 2X) | 99.317 | 6.83 | 0.730 |
| 9 | 71.65 | +20 (charged 1X) | 98.610 | 6.8 | 0.629 |
| 10 | 41.55 | +22 (charged 1X) | 98.308 | 2.4 | 1.700 |
| 11 | 41.55 | +21 (charged 1X) | 98.718 | 2.5 | 1.743 |
| 12 | 76.45 | +20 (charged 2X) | 98.063 | 9.7 | 0.407 |
| 13 | 24.55 | +22 (charged 2X) | 89.010 | 1.1 | 2.007 |
| 14 | 24.55 | +22 (charged 1X) | 90.33 | 1.0 | 2.336 |

[a]8 and 9 are 3 oz/yd² PP; 10 and 11 are 1 oz/yd² PP; 12 is a meltdown/cotton/meltdown thermally bonded composite; 13 and 14 are 1 oz/yd² recycled PET.
[b]Before charging.
[c]Potential on the wire in kV; the rollers were grounded.
[d]After charging.

It is important to note that additional charging operations, performed in series, may be advantageous in some cases (i.e., charged 3×, 4×, 5×, 6×, etc.). This may be of particular interest where the webs are being processed at comparatively higher speeds (e.g., at speeds of 1,000 feet/minute, or more).

TABLE V

| | Surface Charge Potentials | | | |
|---|---|---|---|---|
| | Screen Side | | Face Side | |
| No.[a] | Arith. Avg. | Abs. Avg. | Arith. Avg. | Abs. Avg. |
| 8 | +54 | 404 | −465 | 481 |
| 9[b] | +523 | 576 | −637 | 637 |
| 10[b] | +570 | 570 | −670 | 670 |
| 11 | +174 | 239 | −192 | 212 |
| 12 | −9 | 31 | +185 | 185 |
| 13 | −143 | 256 | −178 | 206 |
| 14[b] | 34 | 201 | −179 | 208 |

[a]Same samples as in Table IV.
[b]Single charge with screen side adjacent the roller at the negative potential.

Table IV shows that the process of charging a web with the apparatus of FIG. 1 (Technique I) produces webs with good filtering efficiencies and excellent filtration qualities. In addition, Table V shows that the process produces bipolar webs with good charge differentials between the two sides of the web.

EXAMPLE III

Cold Charging using the Apparatus of FIG. 4: Table VI lists the conditions and charging results for a variety of webs charged on an apparatus according to FIG. 4 (Technique II). Table VII lists the measured surface charge potential for those webs.

TABLE VI

| No.[a] | Filt. Eff.[b] | Charging Voltage[c] | Filt. Eff.[d] | Δp | $q_F$ |
|---|---|---|---|---|---|
| 15 | 71.65 | +23, −19 (2X) | 99.956 | 6.9 | 1.120 |
| 16 | 71.65 | +21, −19 (1X) | 99.950 | 6.55 | 1.160 |
| 17 | 41.55 | +25, −19 (2X) | 96.278 | 2.3 | 1.431 |
| 18 | 41.55 | +25, −19 (1X) | 95.525 | 2.55 | 1.218 |
| 19 | 24.55 | +25, −19 (2X) | 80.35 | 0.9 | 1.808 |
| 20 | 24.55 | +25, −15 (1X) | 81.90 | 1.0 | 1.709 |

[a]15 and 16 are 3 oz/yd² PP; 17 and 18 are 1 oz/yd² PP; 19 and 20 are 1 oz/yd² recycled PET.
[b]Before charging.
[c]kV for wire, shell (number of chargings).
[d]After charging.

TABLE VII

| | Surface Charge Potentials | | | |
|---|---|---|---|---|
| | Screen Side | | Face Side | |
| No.[a] | Arith. Avg. | Abs. Avg. | Arith. Avg. | Abs. Avg. |
| 15 | +1062 | 1099 | −2208 | 2208 |
| 16[b] | +1235 | 1239 | −1678 | 1678 |
| 17 | +183 | 297 | −30 | 166 |
| 18[b] | −37 | 183 | −275 | 294 |
| 19 | −179 | 244 | −66 | 164 |
| 20[b] | −233 | 283 | −126 | 186 |

[a]Same samples as in Table IV.
[b]Single charge with screen side adjacent the shell at the negative potential.

Table VI shows that the process of charging a web with the apparatus of FIG. 4 (Technique II) produces webs with good filtering efficiencies and excellent filtration qualities for high basis weight webs (i.e., greater than about 1.5 oz/yd²) and produces webs with adequate filtration efficiencies and filtration qualities for lower basis weight webs (i,e,, less than about 1.5 oz/yd$^2$). In addition, Table VII shows that the process produces bipolar webs with good charge differentials between the two sides of the web. While the "crossover figure" of 1.5 oz/yd$^2$ appears to be particularly relevant to meltblown polypropylene webs, this figure may differ from material to material, and can be readily determined by testing of the web involved.

EXAMPLE IV

Accelerated Aging Teats: Samples of the various webs were subjected to a temperature of 137° C. for 10 minutes to simulate the effects of aging on the charge of the web. The results are shown in Table VIII.

TABLE VIII

| No. | Filt. Eff.[a] | Filt. Eff.[b] | Δp[a] | Δp[b] | $q_F^a$ | $q_F^b$ |
|-----|---------|---------|------|------|-------|-------|
| 2 | 98.708 | 92.390 | 2.2 | 2.1 | 1.977 | 1.227 |
| 6 | 98.460 | 97.370 | 2.45 | 2.2 | 1.703 | 1.653 |
| 7 | 99.937 | 99.866 | 6.8 | 6.1 | 1.084 | 1.084 |
| 8 | 99.317 | 99.279 | 6.83 | 6.1 | 0.730 | 0.809 |
| 9 | 98.610 | 98.588 | 6.8 | 6.2 | 0.629 | 0.687 |
| 10 | 98.308 | 97.583 | 2.4 | 2.2 | 1.700 | 1.692 |
| 11 | 98.718 | 97.178 | 2.5 | 2.2 | 1.743 | 1.622 |
| 12 | 98.063 | 96.143 | 9.7 | 9.8 | 0.407 | 0.332 |
| 15 | 99.956 | 99.925 | 6.9 | 6.3 | 1.120 | 1.142 |
| 16 | 99.950 | 99.886 | 6.55 | 6.0 | 1.160 | 1.129 |
| 17 | 96.278 | 95.858 | 2.3 | 2.2 | 1.431 | 1.447 |
| 18 | 95.525 | 94.913 | 2.55 | 2.2 | 1.218 | 1.354 |

[a]Before accelerated aging.
[b]After accelerated aging.

The webs produced according to the methods of the present invention show excellent response to the accelerated aging test. The filtering efficiency and the filtration quality are maintained at consistent levels, at least as good as the prior art.

EXAMPLE V

Biased Charging Drum Charging: Low basis weight (1 oz/yd$^2$) and high basis weight (3 oz/yd$^2$) polypropylene webs were charged with an apparatus according to FIG. 1 (Technique I). In all cases, the charging bar was biased to apply a positive charge while the charging drum was biased to apply a negative charge according to Table IX. The height of the charging bar above the conductive charging drum was in each case 1.0 inches. Table X shows conditions and charging results for the webs charged on an apparatus according to FIG. 1 (Technique I), and Table XI lists the measured surface charge potential for those webs.

TABLE IX

| | Charging Voltages (kVDC) | | | |
|---|---|---|---|---|
| No.[a] | Bar 1 | Bar 2 | Drum 1 | Drum 2 |
| 21 | +10.5 | +10.5 | −10.5 | −10.5 |
| 22 | +16 | +16 | −4 | −4 |
| 23 | +15 | +15 | −4 | −4 |
| 24 | +9 | +9 | −9 | −9 |

[a]21 and 22 are 3 oz/yd$^2$ polypropylene; 23 and 24 are 1 oz/yd$^2$ polypropylene.

TABLE X

| No.[a] | Filt. Eff.[b] | Filt. Eff.[c] | Δp | $q_F$ |
|---|---|---|---|---|
| 21 | 71.65 | 97.308 | 6.45 | 0.560 |
| 22 | 71.65 | 98.607 | 5.2 | 0.822 |
| 23 | 41.55 | 99.191 | 2.5 | 1.927 |
| 24 | 41.55 | 98.844 | 2.5 | 1.984 |

[a]Same as in Table IX.
[b]Before charging.
[c]After charging.

TABLE XI

| | Surface Charge Potentials | | | |
|---|---|---|---|---|
| | Screen Side | | Face Side | |
| No.[a] | Arith. Avg. | Abs. Avg. | Arith. Avg. | Abs. Avg. |
| 21 | +100 | 356 | −238 | 284 |
| 22 | −76 | 287 | −315 | 351 |
| 23 | +540 | 540 | −592 | 592 |
| 24 | +527 | 527 | −505 | 505 |

[a]Same as in Table IX.

As is seen in Tables IX–XI, webs are produced using biased charging drums. Contrary to the expectations of the prior art, the webs exhibit high values of filtering efficiency and filtration quality.

EXAMPLE VI

Charging of Anionically Grafted Polyolefin: A polyolefin web was prepared by mixing an original polypropylene with a polypropylene that had been grafted with 6 wt. % acrylic acid. The polyolefin mixture was charged by a variety of methods. Table XII shows conditions and charging results for the webs.

TABLE XII

| No.[a] | Chg. Method[b] | Filt. Eff.[c] | Filt. Eff.[d] | Δp | $q_F$ |
|---|---|---|---|---|---|
| 25 | A | 45.70 | 98.708 | 2.2 | 1.977 |
| 26 | B | 38.25 | 99.103 | 2.25 | 2.095 |
| 27 | B | 45.70 | 98.695 | 2.05 | 2.117 |
| 28 | C | 45.70 | 97.33 | 2.6 | 1.39 |
| 29 | C | 45.70 | 96.37 | 2.5 | 1.33 |

[a]25, 27, 28, and 29 are 10 wt. % grafted polypropylene in 90 wt. % ungrafted polypropylene; 26 is 5 wt. % grafted polypropylene in 90 wt. % ungrafted polypropylene.
[b]A is the contact cloth method of U.S. Pat. No. 4,375,718 to Wadsworth, et al.; B is the method using the apparatus of FIG. 1; C is the method using the apparatus of FIG. 4.
[c]Before charging.
[d]After charging.

Table XII shows that the web is efficiently charged to acceptable levels so as to produce a web with substantially good filtering efficiency and filtration quality. Upon accelerated aging testing, sample numbers 25 and 28 also showed good retention of the charge. Sample number 25 had a filtering efficiency of 92.390 and Sample number 28 had a filtering efficiency of 87.64. As was discussed above, these results are unexpected in light of the nature of the mixture. The presence of anions grafted to the polyolefin would lead a person having skill in the art to predict that the charge would bleed off the web with time.

EXAMPLE VII

Charging at Elevated Temperature: Table XIII lists the conditions and charging results for a variety of webs charged on an apparatus according to FIG. 1 (Technique I) and an apparatus according to FIG. 4 (Technique II), at ambient and elevated (150° F.) temperatures. Such charging was performed on both polypropylene and polyester webs.

of FIG. 4 (Technique II) produces webs with good filtering efficiencies and excellent filtration qualities. For relatively thin webs, Technique I appears to be especially satifactory and is not adversely affected by elevated humidity. For

TABLE XIII

| | | | | Charge Potential (V) | | | | | |
| | | | | Outside | | Inside | | NaCl | |
| Sample[a] | Technique | Fabric Temp.[d] When Charged | Control Filt. Eff. | Arith. Avg. | Absol. Avg. | Arith. Avg. | Absol. Avg. | Filt. Eff.[e] | Δp (mm water) |
|---|---|---|---|---|---|---|---|---|---|
| 0.75 oz. PP | I[b] | 150° F. | 28.43 | 143 | 21.7 | −437 | 437 | 94.8 | 1.7 |
| | I | Ambient | 28.43 | 154 | 210 | −422 | 422 | 94.3 | 1.7 |
| | II[c] | 150° F. | 27.9 | 83 | 177 | −78 | 282 | 90.8 | 1.6 |
| | II | Ambient | 27.9 | 169 | 170 | −130 | 220 | 92.7 | 1.65 |
| 3 oz. PP | I | 150° F. | 68.2 | 162 | 413 | −624 | 659 | 95.99 | 6.2 |
| | I | Ambient | 68.2 | 154 | 355 | −1103 | 1120 | 98.7 | 6.3 |
| | II | 150° F. | 68.2 | 625 | 898 | 197 | 482 | 99.593 | 6.2 |
| | II | Ambient | 68.2 | 565 | 873 | −1352 | 1367 | 99.859 | 6.4 |
| 1 oz. PET | I | 150° F. | 11.6 | 6 | 48 | −105 | 116 | 32.7 | 0.5 |
| | I | Ambient | 11.6 | −128 | 233 | −520 | 526 | 52.5 | 0.5 |
| | II | 150° F. | 11.6 | −225 | 229 | −278 | 297 | 45.2 | 0.6 |
| | II | Ambient | 11.6 | 280 | 295 | −132 | 161 | 52.5 | 0.6 |

[a]Melt blown (MB) webs.
[b]Wire height above steel roll of 1 inch, 18–20 kV positive potential on wire and bias of 1–2 kV negative potential on both rolls.
[c]Wire-in-shell configuration with 5-inch diameter aluminum shells, +24 kV potential on the wire, −24 kV on each shell and 5 wooden dowels, 1-inch diameter.
[d]MB webs were laced around the collector cylinder of a 20-inch horizontal MB line and hot air was blown onto the webs which were heated such that they were all at 150° F. upon entering the charging unit.
[e]Challenged by aerosol of 0.1 micron sodium chloride particles travelling at 5 cm/s.

Table XIII shows that the process of charging a web with either the apparatus of FIG. 1 (Technique I) or the apparatus of FIG. 4 (Technique II) produces webs with good filtering efficiencies and excellent filtration qualities, and that these results are not adversely affected by elevated temperature.

EXAMPLE VIII

Charging at High Humidity: Table XIV lists the conditions and charging results for a variety of webs charged on an apparatus according to FIG. 1 (Technique I) and an apparatus according to FIG. 4 (Technique II), at typical (40%) and high (95%) humidities. Such charging was performed on polypropylene webs of varying weight and fiber diameter.

thicker webs, the filtration efficiency is remarkably increased using Technique II. This offers greater flexibility depending on the nature of the web.

EXAMPLE IX

Cold Charging of Laminated Fabrics: Table XV lists the conditions and charging results for a variety of webs charged on an apparatus according to FIG. 1 (Technique I) and an apparatus according to FIG. 4 (Technique II). Laminated fabrics (meltblown and spunbond layers) were charged according to the conditions listed, in different orientations (i.e., meltblown layer facing up and meltblown layer facing down). The specified orientation (for the meltblown layer) represents the orientation which the identified layer assumed

TABLE XIV

| Samples | | Typical[a] | | Tech. I[b] | | Tech. II[c] | |
| Weight | Fiber Dia. (μm) | Filt. Eff. | Δp (mm water) | Filt. Eff. | Δp (mm water) | Filt. Eff. | Δp (mm water) |
|---|---|---|---|---|---|---|---|
| 33 g/m$^2$ | φ = 2.14 μm | 53.9 | 2.4 | 97.3 | 2.4 | 95.0 | 2.7 |
| 52 g/m$^2$ | φ = 2.12 μm | 70.0 | 3.6 | 99.10 | 3.8 | 99.45 | 4.1 |
| 101 g/m$^2$ | φ = 2.20 μm | 88.9 | 6.0 | 99.22 | 7.5 | 99.999 | 7.0 |
| 13.6 g/m$^2$ | φ = 2.05 μm | 27.5 | 0.95 | 85.1 | 1.2 | 63.2 | 1.1 |
| 33 g/m$^2$ | φ = 5.50 μm | 14.5 | 0.55 | 60.2 | 0.6 | 59.6 | 0.8 |

[a]Typical values at 70° F. and at 40% humidity.
[b]Wire height above steel roll of 1-inch, 18–20 kV positive potential on wire and bias of 1–2 kV negative potential on both rolls; at 95% humidity and 70° F.
[c]Wire-in-shell configuration using only one aluminum shell with a diameter of 5-inches and with three 1 3/8-inch diameter wood dowels; at 95% humidity and 70° F.

Table XIV shows that the process of charging a web with either the apparatus of FIG. 1 (Technique I) or the apparatus when entering the apparatus (an apparatus according to FIG. 6 suitably connected to assume a configuration according to FIG. 1 or a configuration according to FIG. 4) from the right side (as viewed in FIG. 6).

TABLE XV

| | | Control | | Charged | | | | | |
|---|---|---|---|---|---|---|---|---|---|
| Wt. | Dist.[a] | Eff. | Δp | Tech. | MB | V | I | Eff. | Δp |
| 20 | 5.1 | 31.0 | 1.5 | I | up | 35/−1 | 2.0 | 94.5 | 1.6 |
| 20 | 8.9 | 31.0 | 1.5 | II | up | 35/−32 | 1.0 | 89.7 | 1.6 |
| 20 | 8.9 | 31.0 | 1.5 | II | down | 35/−32 | 0.6 | 90.6 | 1.6 |
| 20 | 5.1 | 31.0 | 1.5 | I | down | 40/−1 | 4.0 | 89.2 | 1.7 |
| 20 | 5.1 | 40.8 | 2.5 | I | up | 35/−1 | 2.6 | 97.7 | 2.9 |
| 20 | 8.9 | 40.8 | 2.5 | II | up | 35/−32 | 0.6 | 94.5 | 2.8 |
| 20 | 8.9 | 40.8 | 2.5 | II | down | 35/−32 | 0.6 | 93.1 | 2.6 |
| 20 | 5.1 | 40.8 | 2.5 | I | down | 45/−1 | 6.0 | 92.7 | 2.6 |
| 25 | 5.1 | 34.3 | 1.7 | I | up | 40/−1 | 5.0 | 97.5 | 1.8 |
| 25 | 8.9 | 34.3 | 1.7 | II | up | 35/−31 | 0.6 | 94.5 | 2.1 |
| 25 | 8.9 | 34.3 | 1.7 | II | down | 35/−32 | 0.6 | 91.5 | 2.0 |
| 25 | 5.1 | 34.3 | 1.7 | I | down | 40/−1 | 5.0 | 91.1 | 1.9 |
| 25 | 5.1 | 45.5 | 2.9 | I | up | 40/−1 | 5.0 | 98.1 | 3.0 |
| 25 | 8.9 | 45.5 | 2.9 | II | up | 35/−32 | 0.6 | 95.3 | 2.8 |
| 25 | 8.9 | 45.5 | 2.9 | II | down | 35/−32 | 0.6 | 94.0 | 3.0 |
| 25 | 5.1 | 45.5 | 2.9 | I | down | 40/−1 | 5.0 | 94.9 | 3.0 |
| 30 | 5.1 | 37.9 | 2.0 | I | up | 40/−1 | 5.5 | 95.8 | 2.2 |
| 30 | 8.9 | 37.9 | 2.0 | II | up | 35/−32 | 0.6 | 96.7 | 2.4 |
| 30 | 8.9 | 37.9 | 2.0 | II | down | 35/−30 | 0.5 | 96.7 | 2.4 |
| 30 | 5.1 | 37.9 | 2.0 | I | down | 40/−1 | 5.5 | 93.9 | 2.3 |
| 30 | 5.1 | 49.9 | 3.5 | I | up | 42/−1 | 5.5 | 98.7 | 3.9 |
| 30 | 8.9 | 49.9 | 3.5 | II | up | 34/−34 | 0.6 | 98.7 | 4.0 |
| 30 | 8.9 | 54.4 | 3.4 | II | up | 33/−33 | 0.6 | 98.7 | 3.8 |
| 30 | 5.1 | 54.4 | 3.4 | I | up | 40/−1 | 5.6 | 98.5 | 3.8 |
| 40 | 8.9 | 46.6 | 2.6 | II | up | 35/−32 | 0.6 | 98.5 | 3.0 |
| 40 | 5.1 | 46.6 | 2.6 | I | up | 40/−1 | 6.0 | 97.2 | 3.0 |
| 40 | 5.1 | 46.6 | 2.6 | I | down | 40/−1 | 6.0 | 95.6 | 3.0 |
| 40 | 8.9 | 46.6 | 2.6 | II | down | 32/−30 | 0.4 | 98.7 | 2.7 |
| 80 | 8.9 | 66.3 | 4.7 | II | up | 30/−28 | 0.7 | 99.50 | 5.4 |
| 80 | 8.9 | 66.3 | 4.7 | II | down | 30/−28 | 1.7 | 99.89 | 5.3 |

[a]Distance (in cm.) between the charging wire or bar and the corresponding drum or shell.

Table XV shows that when webs are charged with an apparatus according to FIG. 1 (Technique I), the orientation of the meltblown layer (of the laminated web) will have an effect upon the filtering efficiency which is achieved. It has been found that when the meltblown layer faces upwardly when traversing the second of the two charging drums, a higher filtering efficiency is achieved. Without wishing to be bound by such explanation, it is believed that this results from a need to ensure contact between the meltblown layer of the laminated web and the surface of the second drum to provide a greater permanence to the charge. When webs are charged with an apparatus according to FIG. 4 (Technique II), the orientation of the meltblown layer relative to the charging apparatus appears to have no appreciable effect upon the filtering efficiency which is achieved.

Although this specification discloses particular embodiments of the invention, these examples merely describe illustrations of the invention. Those skilled in the art may suggest numerous rearrangements, modifications and substitutions of parts of the invention without departing from the spirit of the invention. For example, it will occur to a skilled practitioner in the art that a similar type of charging may be effected by alternately varying the polarity of the charging bars and wires and the charging rollers and shells rather than varying the side of the web that is exposed to them. Also suggested are numerous rearrangements, modifications and substitutions of materials forming the webs without departing from the spirit of the invention.

In particular, it will occur to a skilled practitioner in the art that the configuration of the apparatus used for cold charging of the webs may be varied. For example, the apparatus according to FIG. 1 (Technique I) is ordinarily comprised of a wire in conjunction with a steel drum. However, different wire and drum materials can be used provided they are appropriately conductive. It is even possible to replace the wire with a series of pins, or a charging bar, if desired. In such case, the series of pins are radially oriented relative to the drum, and are longitudinally aligned with one another to form a single row of pins extending longitudinally along the corresponding drum, serving a function equivalent to the single wire replaced by the series of pins.

The apparatus according to FIG. 4 (Technique II) is also capable of variation. For example, the apparatus according to FIG. 4 (Technique II) is ordinarily comprised of a bar in conjunction with an aluminum shell. As with the apparatus according to FIG. 1 (Technique I), the bar can be replaced with a series of pins which are radially oriented relative to the shell and longitudinally aligned with one another to form a single row extending longitudinally along the corresponding shell. Alternatively, a plurality of rows of pins may be used, forming a radial pattern extending from the center of the shell to its inner surface. Different bar and shell materials can be used provided they are appropriately conductive. For example, the shell can be formed of a variety of conductive materials including metals, conductive plastics and ceramics provided with a suitable conductive outer coating (forming the inner surface of the shell).

Also capable of variation are the rollers used to support the web as it progresses through the overlying shell (e.g., the rollers 122, 136 in FIG. 4, as well as the rollers 120, 128 and 134, 142 if they are insulative rollers, as well as the corresponding rollers of the apparatus of FIG. 6). As indicated previously, these rollers can be formed of wood, plastic or a ceramic. Such materials may be used in forming the rollers either as unitary structures, or as composites.

Figure 7A:
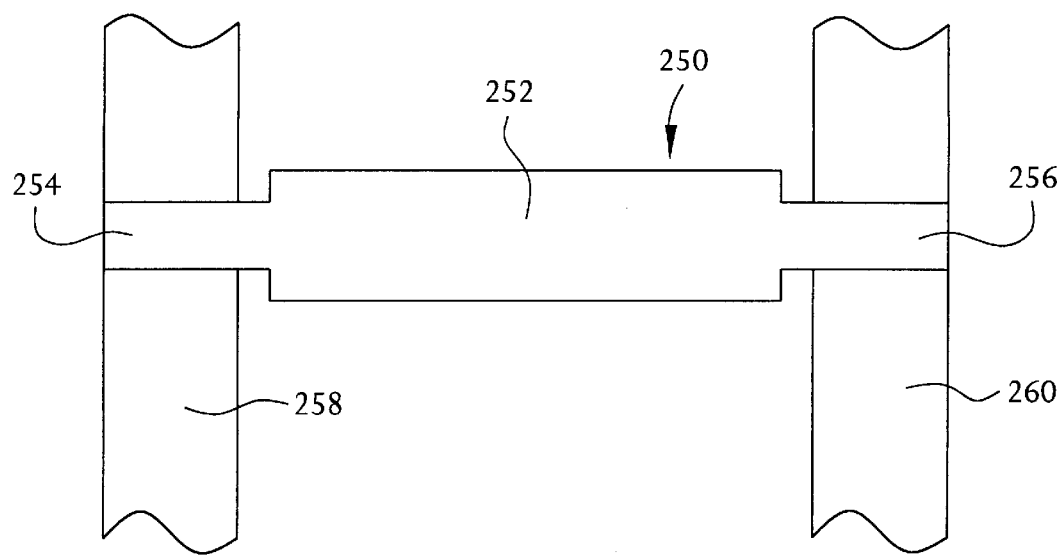
FIG. 7a is an elevational view of a unitary roller for supporting a transported web.

FIG. 7a shows a unitary roller 250 which includes a body 252 having opposing ends 254, 256 of a reduced diameter. The ends 254, 256 are appropriately journalled for rotation within and between the end plates 258, 260 which comprise the charging apparatus. Unitary rollers are most useful when formed of relatively rigid materials, such as some plastics, ceramics, and wood dowels used in supporting fabrics having a width of two meters or less.

Figure 7B:
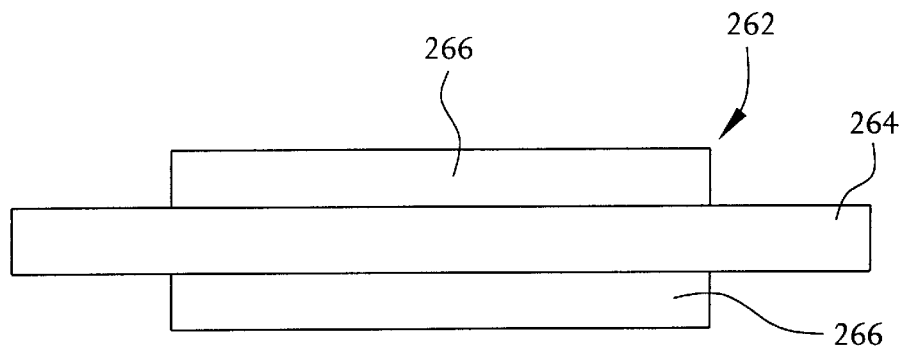
FIG. 7b is an elevational view of an alternative embodiment roller for supporting a transported web.

For less rigid materials (including some plastics and wood), and referring to FIG. 7b of the drawings, the rollers 262 are preferably provided with a metal shaft 264 running through the center to provide additional structural integrity to the roller body 266. The use of a metal shaft is further recommended as the length of the rollers increases beyond one or two meters. In any event, a more stable roller results, which in turn minimizes bending or distortion of the roller when placed in service.

Figure 7C:
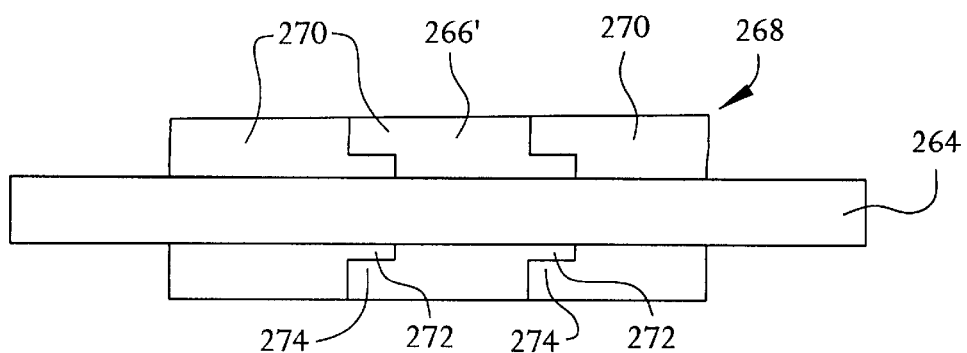
FIG. 7c is an elevational view of a further alternative embodiment roller for supporting a transported web.

FIG. 7c of the drawings shows yet another alternative roller 268 useful in supporting transported webs. In this embodiment, the unitary (outer) roller body 266 is replaced with a roller body 266' formed of a series of segmented sections 270. This has been found to be particularly useful for rollers formed of wood, although plastic rollers would also benefit from such construction. The segmented sections 270 can, and preferably include male elements 272 and female elements 274 which interact to facilitate assembly of the segmented sections 270 on the central shaft 264. The central (metal) shaft 264 also allows the resulting rollers to rotate with less vibration and friction. The segmented sections 270 preferably have a length on the order of 6 to 10 inches. The male/female elements 272, 274 are useful in minimizing potential effects that the jointed segments may have on the electric field during charging of the webs. Glues which serve as good insulators may be used to improve the jointed connections, if desired. The segmented sections 270 may also be machined (e.g., on a lathe) following their assembly to form a more uniform roller, to minimize any effects of the joints on the webs to be transported through the apparatus.

Table XVI lists the conditions and charging results for a variety of webs charged on an apparatus according to FIG. 4 (Technique II) using various different types of rollers including rollers formed of wood, plastics and ceramics, as well as segmented wood rollers.

TABLE XVI

| Basis Wt.[a] (g/m$^2$) | Roller[b,c] Type | Current (mA) | Voltage (V) | Filt. Eff. (%) | Δp (mm H$_2$O) |
| --- | --- | --- | --- | --- | --- |
| 30 | nylon | 1.0 | +40/−40 | 95.82 | 1.45 |
| 60 | nylon | 0.2 | +36/−36 | 96.91 | 3.4 |
| 80[d] | nylon | 0.6 | +35/−33 | 99.763 | 4.6 |
| 80[d] | joint wood[e] | 0.4 | +30/−30 | 99.868 | 4.7 |
| 60 | joint wood[e] | 0.2 | +35/−33 | 98.48 | 3.7 |
| 30 | joint wood[e] | 0.1 | +31/−28 | 92.10 | 1.5 |
| 30 | plexiglass | 0.4 | +40/−38 | 95.97 | 1.6 |
| 60 | plexiglass | 0.2 | +35/−35 | 98.79 | 3.5 |
| 80[d] | plexiglass | 0.6 | +35/−30 | 99.907 | 5.3 |
| 80[d] | wood | 0.8 | +34/−33 | 99.950 | 5.7 |
| 60 | wood | 0.6 | +35/−32 | 99.454 | 3.3 |
| 30 | wood | 0.5 | +38/−38 | 89.84 | 1.5 |
| 30 | ceramic | 0.4 | +30/−18 | 94.81 | 1.6 |
| 60 | ceramic | 0.6 | +30/−25 | 98.78 | 2.7 |
| 3.5 oz/yd$^2$ | ceramic | 0.4 | +35/−33 | 99.807 | 3.8 |
| 3.5 oz/yd$^2$ | wood* | 1.6 | +43/−43 | 99.971 | 5.4 |
| 60 | wood* | 0.6 | +41/−41 | 98.41 | 2.8 |
| 30 | wood* | 0.5 | +45/−45 | 96.26 | 1.3 |
| 80[d] | wood* | 1.2 | +41/−41 | 99.961 | 5.2 |
| 30 | control |  |  | 35.4 | 1.4 |
| 60 | control |  |  | 59.3 | 3.0 |
| 3.5 oz/yd$^2$ | control |  |  | 72.5 | 4.5 |
| 80 | control |  |  | 66.3 | 4.7 |

[a]Basis weight of meltblown polypropylene.
[b]Solid rolls of one material utilized unless otherwise specified.
[c]Metal shell of 8-inch diameter used with all samples except those marked with an asterisk, which were used with a metal shell of 10-inch diameter.
[d]Laminated spunbond (SB)/meltblown (MB) web (weight of SB/PP in the laminate was 20 g/m$^2$).
[e]Metal shaft through wood dowel with straight joints every 7-inches.

Table XVI shows that charging a web with the apparatus of FIG. 4 (Technique II) produces webs with good filtering efficiencies and excellent filtration qualities irrespective of the composition of the rollers used to support the web as it is transported through the apparatus.

Also capable of variation are the charging shells used in an apparatus for charging a web according to the previously described Technique II (e.g., the shells 126, 140 of FIG. 4 and the shells 224, 244 of FIG. 6). For example, this can include variation in the diameter of the shell. In this regard, shells having a diameter of 5, 7, 8 and 10 inches have been employed, and have been found to provide satisfactory results. Any of the above-listed roller configurations should work well with either an 8 inch diameter shell or a 10 inch diameter shell since, in operation, it has generally been found that 10 inch diameter shells work very well when compared to 8 inch diameter shells (this, in conjunction with solid wood rollers on a test apparatus).

Figure 8A:
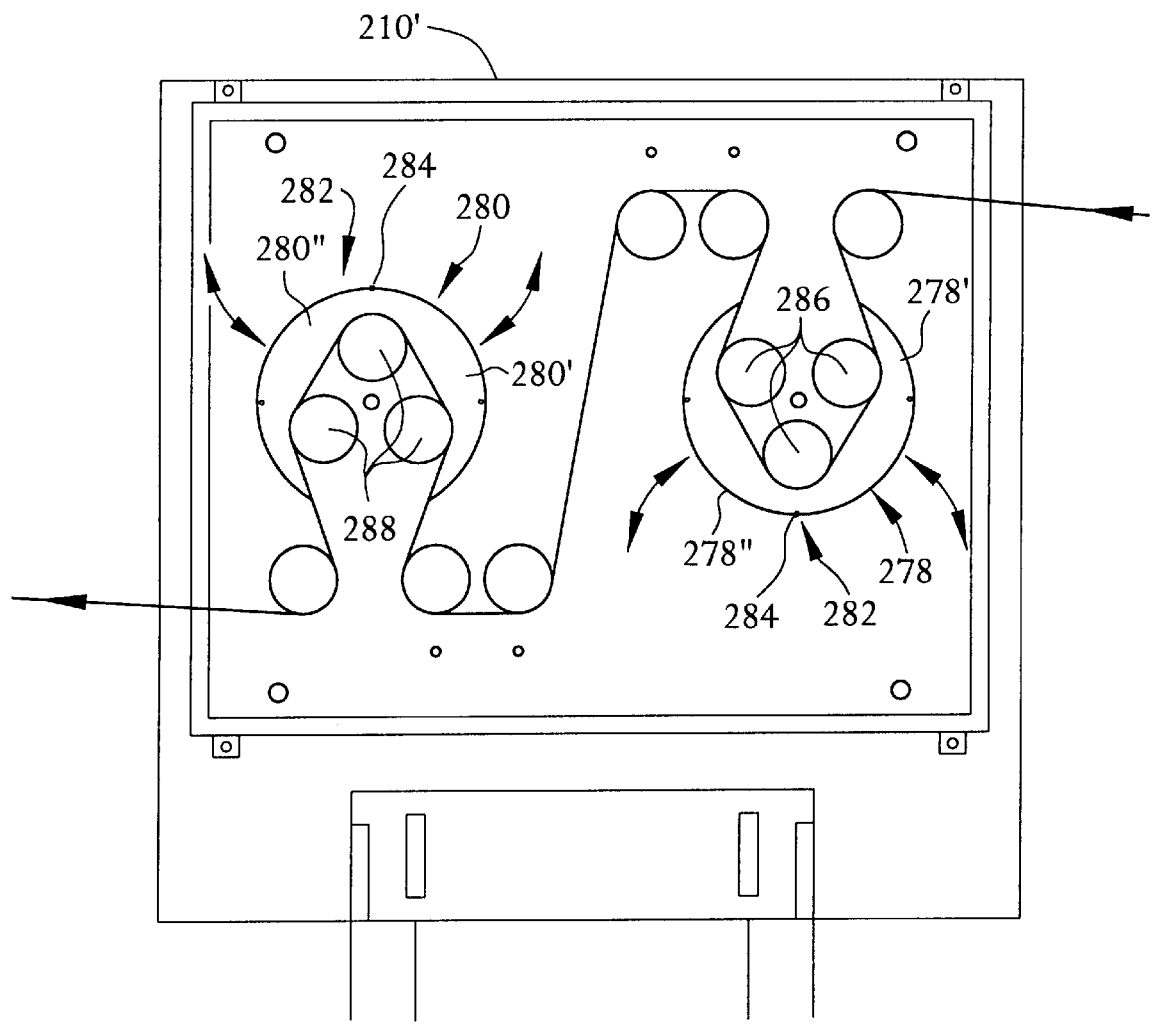
FIG. 8a is a schematic sectional view of an apparatus similar to that of FIG. 6, with split collector shells hinged for access to the web.

This can also include variations in the metal shell to facilitate installation (so-called "lacing up") of the webs in the charging apparatus. For example, FIG. 8a shows an apparatus 210' which substantially corresponds to the apparatus 210 of FIG. 6. However, the apparatus 210' of FIG. 8a incorporates shells 278, 280 which are longitudinally separated into two parts along a seam 282. The resulting shell sections 278', 278" and 280', 280" are preferably equivalent in size and shape, and are connected together by a seamless hinge 284. This allows the resulting shell sections to be swung open and away from the centrally disposed rollers 286, 288 of the apparatus 210', allowing free access for purposes of lacing up the web. Any of a variety of known seamless hinges can be used for such purposes.

Figure 8B:
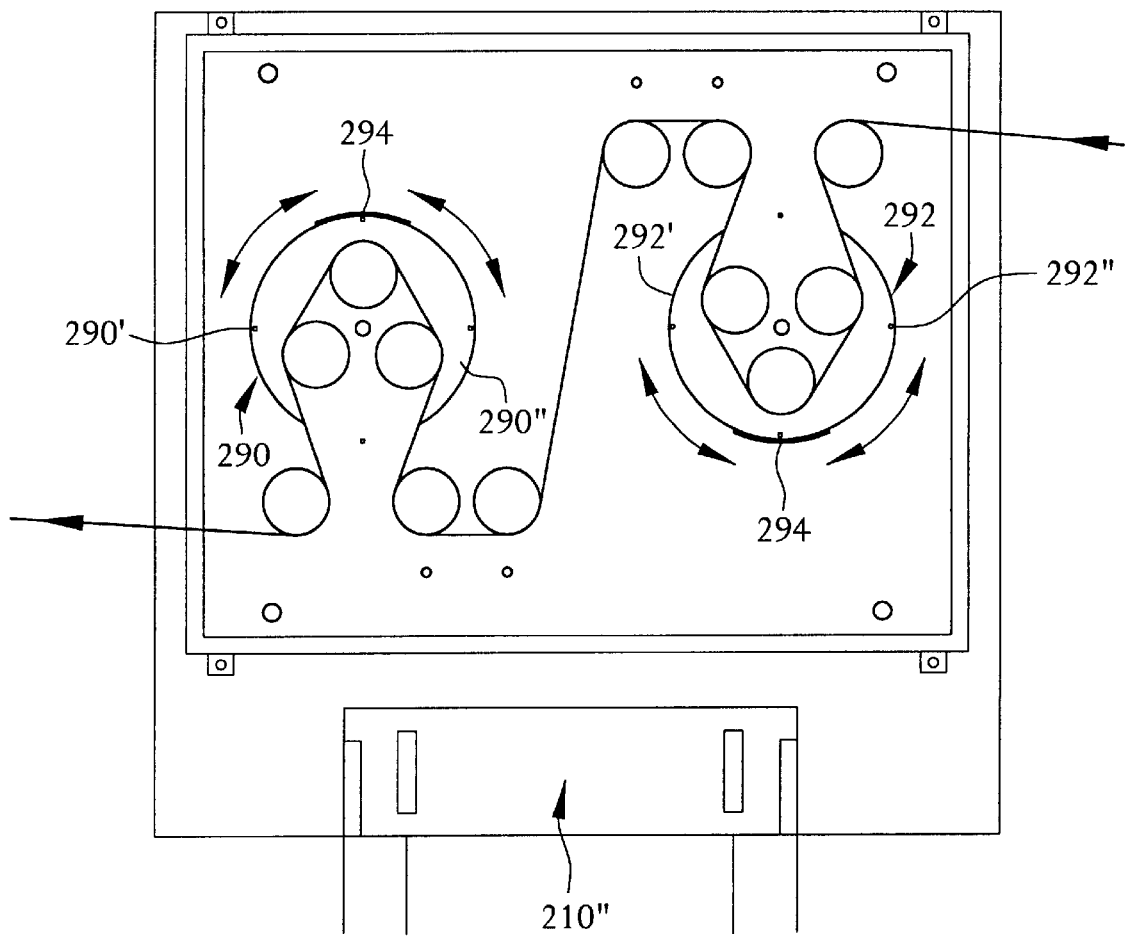
FIG. 8b is a schematic sectional view of an apparatus similar to FIG. 6, with split collector shells joined to slide relative to one another for access to the web.

FIG. 8b again shows an apparatus 210" which substantially corresponds to the apparatus 210 of FIG. 6, and which again incorporates shells 290, 292 formed as shell sections 290', 290" and 292', 292". However, in this embodiment, the shell sections are connected by tracks 294 which permit the shell sections to slide relative to one another, allowing free access for purposes of lacing up the web. Any of a variety of known tracks can be used for such purposes.

It is also possible to provide a unitary shell which is slidingly received between the opposing end plates of the apparatus, so that lacing up of the web can be facilitated by sliding the shell laterally outwardly from the apparatus (from one of its ends). However, this is presently considered less preferred due to the cantilevered length of the resulting shell, which can at times be significant.

Figure 9:
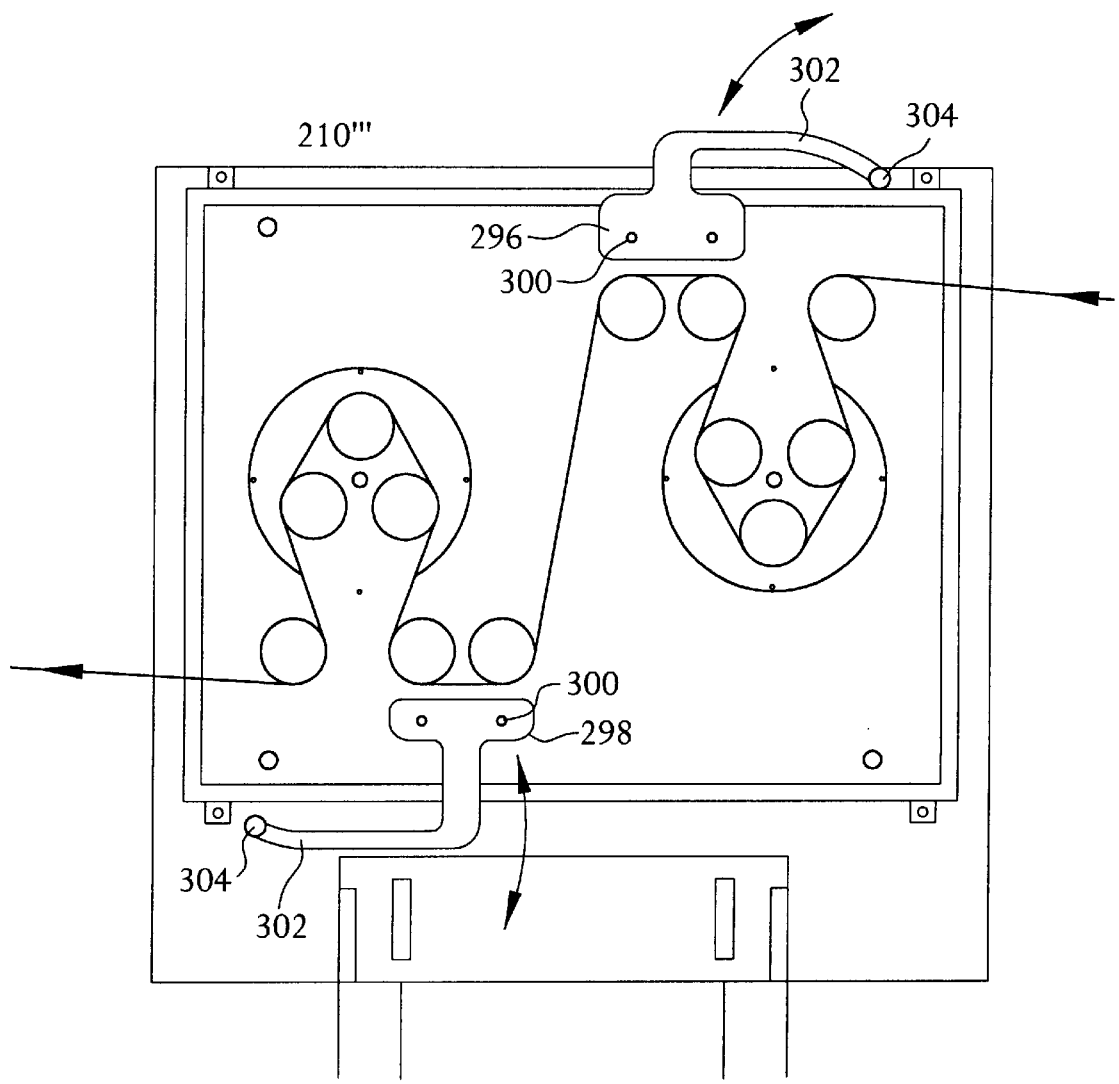
FIG. 9 is a schematic sectional view of an apparatus similar to FIG. 6, with the charging wires mounted to a fixture which can be pivoted for access to the web.

Similar considerations concerning the lacing up of webs can occur in conjunction with an apparatus for charging a web according to the previously described Technique I (e.g., the apparatus of FIG. 1 and the charging bars 230, 236 and drums 228, 234 of FIG. 6), particularly when considering the relatively fragile wires which may form part of such an apparatus. FIG. 9 shows an apparatus 210''' which substantially corresponds to the apparatus 210 of FIG. 6, and which incorporates pivotable fixtures 296, 298 for facilitating lacing up of the webs in the charging apparatus 210'''. In this configuration, the charging wires 300 are received by the fixtures 296, 298 and the fixtures are each in turn associated with an arm 302 which is pivotally connected to the frame 304 of the apparatus 210'''. Lacing up of the web is facilitated by pivoting the fixtures 296, 298 from their normal position adjacent to the corresponding drum, to a retracted position which allows free access to the drum.

It has also been found that any of a variety of power supplies may be used to bias the charging wires/bars and the collecting drums/rollers in accordance with the present invention. For example, both Glassman and SIMCO power supplies have been used for such purposes while achieving satisfactory results. Other power supplies may be selected and used if desired. Depending upon the power supply which is selected for use, potentials reaching 30 kV, 50 kV, and even up to 100 kV or more, can be successfully employed in accordance with the present invention.

It has also been found that the charging wire, the charging bar, the outer surface of the drum and/or the inner surface of the shell can be coated with a thin insulating layer of a plastic (e.g., a synthetic), if desired. This allows a more intense electrical field to be developed, yet without arcing. Such a film may be on the order of a few mils (e.g., 5–80 mils) in thickness, or other thicknesses appropriate to a particular configuration.

The temperature range over which a web or film can be processed in accordance with the present invention is quite broad. However, since it is generally desired to maintain the physical integrity of the web or film (including dimension and/or porosity), it is best not to exceed the temperature at which the material will begin to shrink. Thus, the maximum temperature at or in the vicinity of the charging apparatus will preferably range from about 250° F. to about 200° F. The temperature of the environment in which the foregoing operations may be carried out can vary over a broad range from about 35° F. to about 120° F. (this tends to be governed more by the physiological tolerances of people in the vicinity of the apparatus to ambient conditions, more so than to any limitations on the charging process).

It will also occur to a skilled practitioner in the art that any of a variety of webs formed of any of a variety of materials may be subjected to a similar type of charging as that previously described, including both single and multilayered or laminated webs. For example, deep-grooved 4DG fibers (Eastman Chemical Company) have been treated according to the technique represented by FIG. 4 (Technique II). It was found that the resulting filtration efficiency increased from 20% to 72%. The 4DG fibers have a great deal more surface area which can accept electrostatic charging, leading to such improvements. It is also possible to use lighter weight meltblown nonwoven webs and/or to make the meltblown fibers coarser, and to still obtain high filtration efficiencies and minimal pressure losses making use of the improvements of the present invention.

It has also been found that the previously described cold charging techniques are useful in treating carded webs (pleated or unpleated), especially carded webs adhered to pleated or flat nonwoven webs (in different combinations). Examples of such webs are illustrated in FIGS. 10A through 10E of the drawings, which were prepared as follows.

Figure 10A:
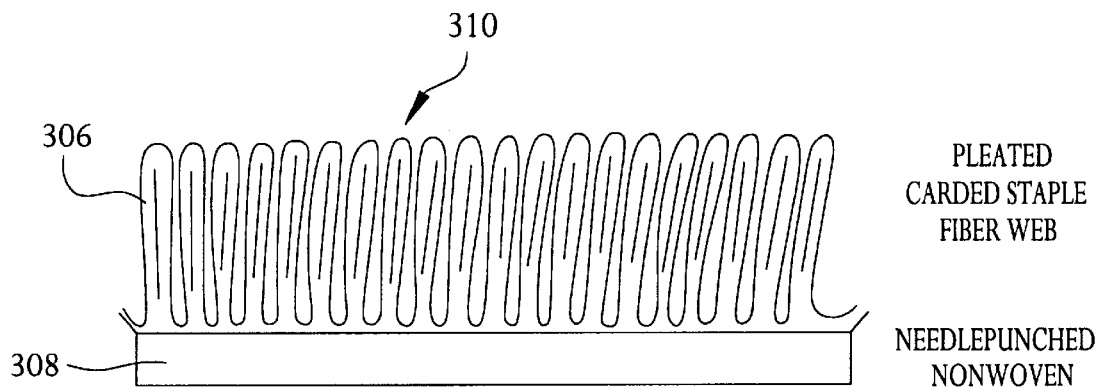
FIGS. 10A to 10E are schematic drawings showing pleated carded webs of varied construction which are suitable for electrostatic charging in accordance with the invention.
Figure 10B:
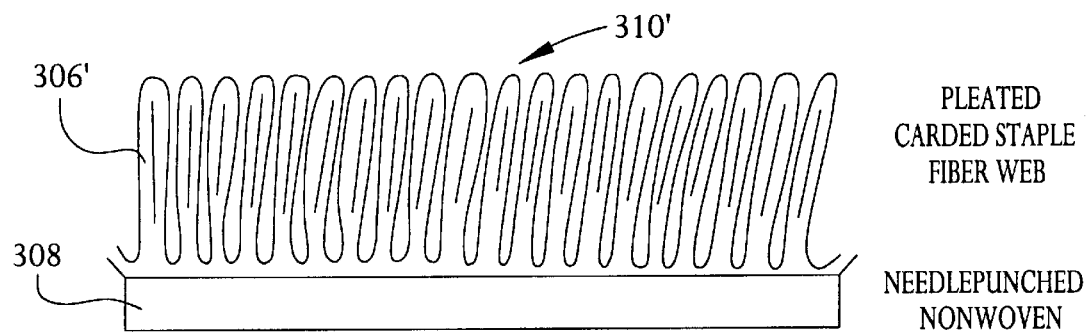

The carded web 306 of FIG. 10A is comprised of a blend of fibers including 75% 6.7 dtex polypropylene and 25% 5.5 dtex polyethylene. The carded web 306' of FIG. 10B is comprised of a blend of fibers including 75% 6.7 dtex polyester and 25% 3.9 dtex polypropylene. Each of these fiber blends were prepared in conventional fiber opening and blending equipment. Each of the carded webs 306, 306' is combined with a nonwoven web 308, which serves as a support and which results in the composite webs 310, 310' of FIGS. 10A and 10B, respectively. In each case, a needlepunched nonwoven web was used as the nonwoven web 308. However, other nonwoven webs such as spunbonded, thermally bonded, latex bonded and hydroentangled webs may also be used, if desired.

For purposes of testing, as will be discussed more fully below, a sample of each composite web 310, 310' (FIG. 10A and FIG. 10B) was prepared without a lubricant (fiber finish), and with a lubricant (fiber finish) resulting from a gentle washing of the composite samples in warm (110 to 140° F.) soapy water, followed by rinsing in warm water (without soap). The washing and rinsing was repeated three times, and the samples were then air dried (the fibers of the webs without the lubricant were prepared by repeatedly washing the ordinary fibers in hot water with a surfactant and in pure hot water, followed by air drying, before carding).

Figure 11:
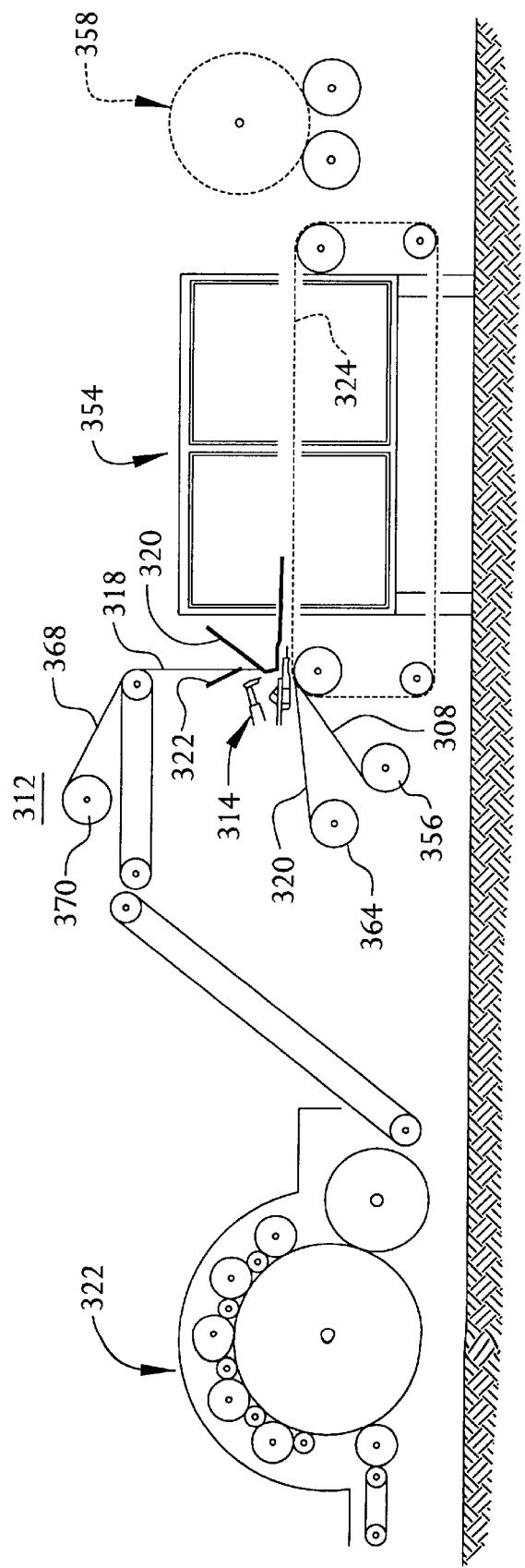
FIG. 11 is a schematic drawing showing an apparatus for producing the pleated carded webs of FIGS. 10A to 10E.
Figure 11B:
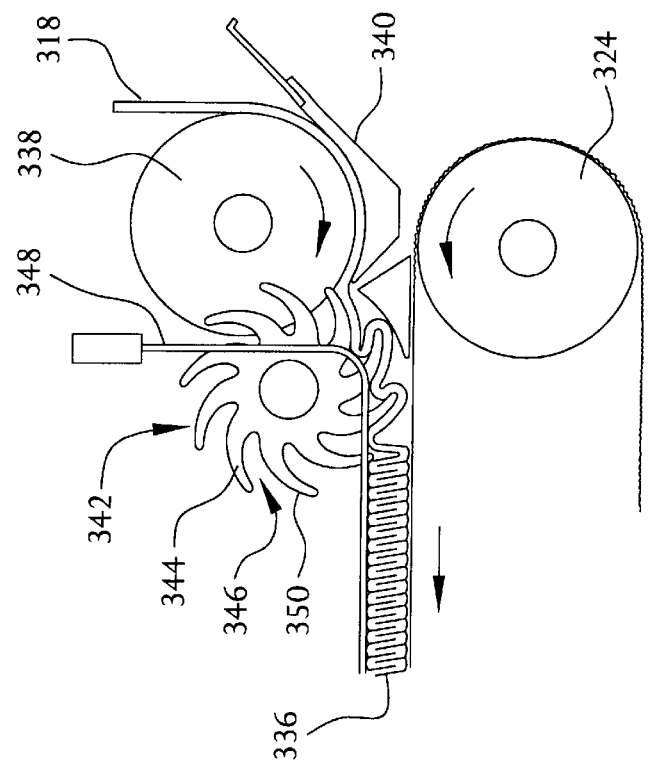
FIGS. 11A and 11B are schematic drawings showing alternative embodiment lappers for use with the apparatus of FIG. 11.
Figure 11A:
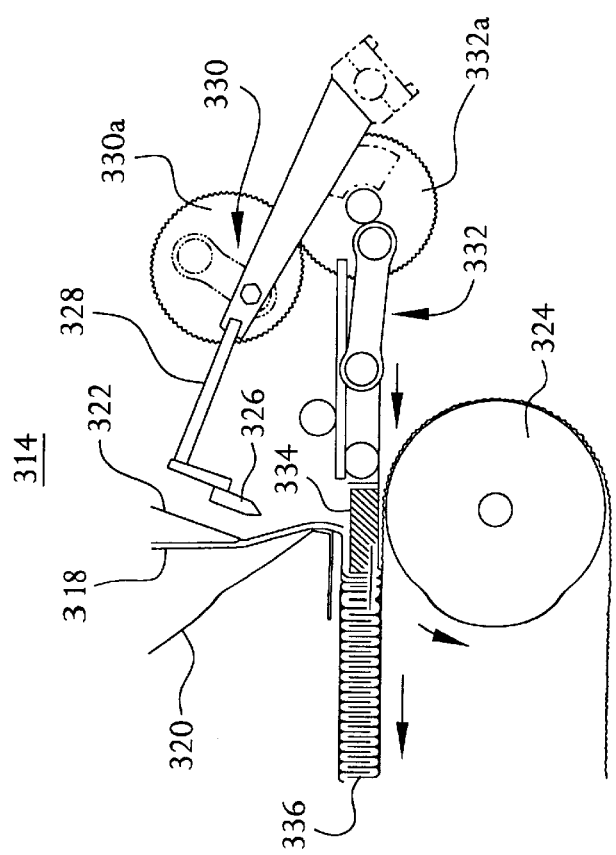

Such webs were constructed on a production line 312 of the "STRUTO" type, which is schematically shown in FIG. 11 of the drawings. Such a production line can incorporate either a vibrating perpendicular lapper 314, as shown in FIGS. 11 and 11A, or a rotating perpendicular lapper 316, as shown in FIG. 11B. In either case, the resulting products are characterized by fibers situated predominantly perpendicular to the plane of such products, and the fibers are molded into wave forms having an amplitude which is shorter than the length of the fibers.

FIG. 11A shows a vibrating perpendicular lapper 314, which initially receives a web 318 (in this case, a carded web) between a wire grid 320 and a guide board 322. The wire grid 320 and the guide board 322 serve to direct the web 318 onto a conveyor belt 324 (which may constitute the conveyor belt of the thru-air oven to be described more fully below). A forming comb 326 is received by an arm 328, which is in turn driven by a bell crank mechanism 330. The gear 330a driving the bell crank mechanism 330 meshes with a gear 332a driving a second bell crank mechanism 332, which causes reciprocating movement of a presser bar 334 (which preferably incorporates a series of needles). As the web 318 is introduced onto the conveyor belt 324, the comb 326 and the presser bar 334 are alternatingly driven (by the bell crank mechanisms 330, 332) into and out of engagement with the web 318 so that the comb 326 produces pleats in the web 318, and so that the presser bar 334 compresses the pleats between the wire grid 320 and the conveyor belt 324. This results in a pleated web 336, which issues from the vibrating perpendicular lapper 314 as shown.

FIG. 11B shows a rotating perpendicular lapper 316, which similarly receives the web 318 for purposes of developing pleats. In this configuration, the web 318 is received between a feeding disk 338 and a fixed guide 340. Rotation of the feeding disk 338 causes the web 318 to pass from between the feeding disk 338 and the fixed guide 340, and into engagement with a working disk 342. The working disk 342 has a series of teeth 344 which form a series of arcuate cavities 346 for receiving the web 318 as it passes from between the feeding disk 338 and the fixed guide 340. Rotation of the working disk 342 (in a clockwise direction) operates to collect portions of the web 318 within the cavities 346 of the working disk 342, and between a wire grid 348 and the conveyor belt 324, forming pleats in the web 318. These pleats are then compressed by the back edges 350 of the teeth 344, producing the pleated web 336.

Further discussion of the production line 312 of FIG. 11 will proceed with reference to a vibrating perpendicular lapper such as is illustrated in FIG. 11A, although it is to be understood that the rotating perpendicular lapper 316 of FIG. 11B is equally useful in such an apparatus. Referring now to FIG. 11, the fibers forming the unpleated web 318 are received from a carding machine 352. As previously described, the web 318 received from the carding machine 352 (e.g., travelling at a speed of about 7 m/min) is introduced between the wire grid 320 and the guide board 322 of the vibrating perpendicular lapper 314, and is received upon the conveyor belt 324, which in this case constitutes the conveyor belt of a "thru-air" oven 354. The nonwoven web 308 (in this case, a needlepunched nonwoven web) is simultaneously introduced (unwound from a feed roller 356) into the vibrating perpendicular lapper 314 so that the nonwoven web 308 comes to rest upon the conveyor belt 324.

Downward movement of the forming comb 326 of the vibrating perpendicular lapper 314 forms a pleated structure (so-called "micropleats", corresponding to the pleated carded webs 306, 306' of FIGS. 10A and 10B, and the pleated carded webs 336 of FIGS. 11A and 11B) which is caused to rest upon a support fabric (corresponding to the nonwoven web 308). By way of illustration, the carded web 318 can have a weight of about 20 g/m$^2$, resulting in pleated carded webs 306, 306' having a weight of about 110 g/m$^2$.

The resulting structure (a combination of the pleated structure and the support fabric) then enters the thru-air oven 354, which fuses the thermoplastic fibers of the pleated structure to each other and to the thermoplastic fibers of the support fabric. By way of example, and for a thru-air oven 354 having a length of 1 meter, the oven was heated to a temperature of about 135° C., with a conveyor speed (conveyor belt 324) of about 0.2 to 1.0 m/min (with a speed of 1.0 m/min being used for staple fiber blends of polypropylene/polyethylene and 0.4 m/min being used for polyester/polypropylene blends). The conveyor speed and the oven temperature will vary with the length of the oven which is used.

If desired, an adhesive web (note the webs 320 of FIGS. 10C and 10D) may be applied to the top surface of the support fabric (the nonwoven web 308) as it is introduced into the vibrating perpendicular lapper 314 as previously described (drawn from the roller 364 of FIG. 11), to further improve adhesion of the pleated structure to the support fabric. The bonded, laminated structure issuing from the thru-air oven 354 is then collected, either by hand or with a take-up apparatus 358.

Typically, the binder fibers (polyester or polypropylene, as appropriate) will soften and stick to other fibers at a temperature which is 10 to 30° C. lower than the temperature of the base fiber. An oven 354 having a length of 3.35 meters, an operating temperature of from 130 to 240° C., and a fabric transport speed of from 1 to 6 m/min, has generally been found to be appropriate. The selected parameters of operation will depend upon the softening point of the lowest melting point material in the composite structure. For these reasons, the composite webs 310, 310' of FIGS. 10A and 10B each contained 25% of the lower melting point binder fibers mixed with the base staple fiber carded webs (intimate fiber blends resulting from first being mixed in a carding willow and then in two cards with a cross transfer, with scotch feed between them) to enhance thermal bonding.

Figure 10C:
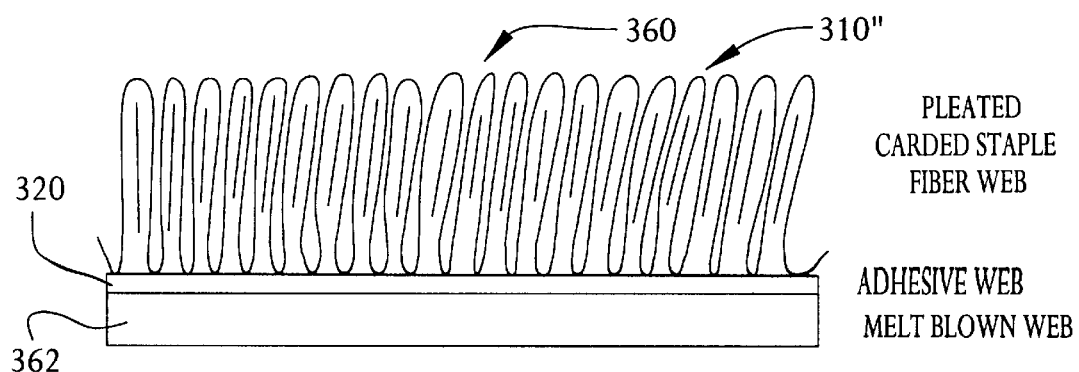

The composite web 360 of FIG. 10C was prepared similarly to the composite webs 310, 310' of FIGS. 10A and 10B, except that a 0.75 oz/yd$^2$ (25 g/m$^2$) meltblown polypropylene web 362 was used instead of a needlepunched nonwoven web 308. In forming the web 360, an adhesive web 320 (comprised of an undrawn low density polyethylene spunbound web with a weight of 50 g/m$^2$) was fed between the pleated carded web 310" and the meltblown web 362 to form an interface between the two, becoming sticky (by partially melting) in the through-air oven 354 and thereby improving adhesion of the pleated carded web to the meltblown web. Laminates similar to those shown in FIGS. 10A and 10B, using meltblown polypropylene webs with weights of 10 and 20 g/m$^2$, respectively, have similarly been made with an interposed adhesive web. The use of an adhesive web in conjunction with such laminated webs was found for best results to be highly desirable in cases where the pleated staple fiber web contained 6.7 dtex, 60 mm polypropylene, which did not contain any lower melting point polyethylene binder fibers.

Figure 10D:
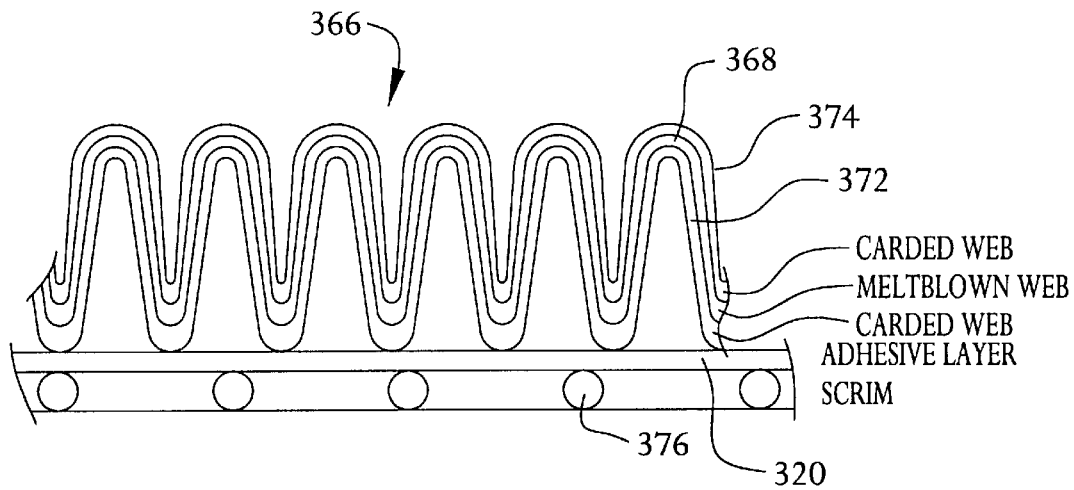

The composite web 366 of FIG. 10D was prepared by depositing a meltblown web 368 (drawn from the roller 370 of FIG. 11) onto an unpleated carded web 372, in a first pass, and by then turning the resulting laminate over and depositing a second unpleated carded web 374 onto the meltblown web 368, in a second pass. The resulting (three-layer) laminate was then passed through the vibrating perpendicular lapper 314 and the thru-air oven 354 in order to produce the large pleats shown (so-called "macropleats"). A scrim netting 376 was also fed onto the conveyor belt 324 (drawn from the roller 378 of FIG. 11, in either the same or a separate pass) and, together with the composite comprised of the webs 368, 372, 374, was fed through the thru-air oven 354 to form the large pleats shown and to attach the structure to the scrim 376. An adhesive web 320 (e.g., drawn from the roller 364 of FIG. 11) is advantageously positioned between the composite comprised of the webs 368, 372, 374 and the scrim 376 (prior to introduction to the thru-air oven) to improve the adhesion achieved at this interface. A laminate similar to the composite web 366 of FIG. 10D can be prepared with pleated carded webs, in place of the unpleated carded webs 372, 374, if desired, producing a composite including both micropleats (the pleated carded webs) and macropleats (the pleated laminate).

Figure 10E:
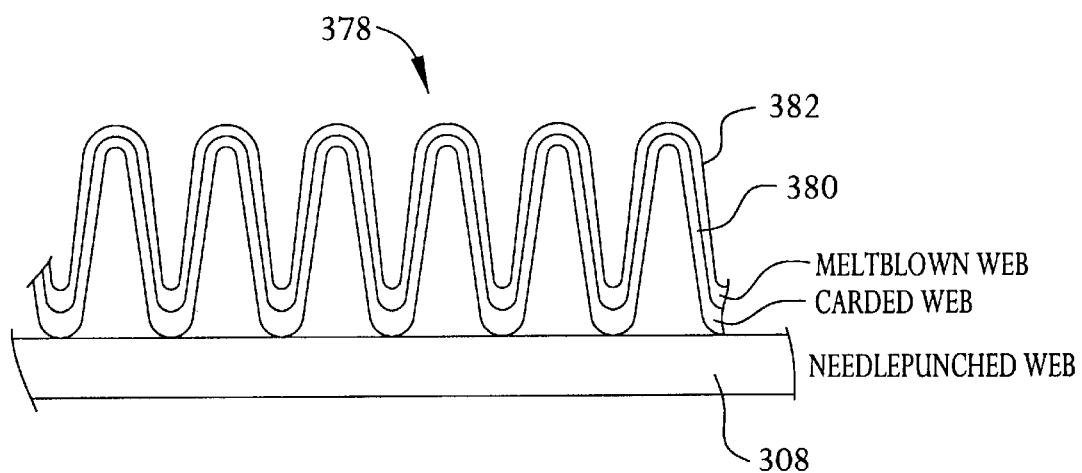

The composite web 378 of FIG. 10E was prepared by first applying a carded web 380 to a 0.75 oz/yd$^2$ (25 g/m$^2$) meltblown polypropylene web 382 (without pleating). The resulting composite was then turned over and passed through the vibrating perpendicular lapper 314, together with a needlepunched web 384 (which serves as a support fabric). In this way, the vibrating perpendicular lapper 314 operates to form the relatively large pleats shown (macropleats), without putting micropleats into the carded web 380. The several layers of the resulting composite web 378 (including the carded staple fibers, e.g., of polyester with polypropylene binder fibers, the meltblown web, and the needlepunched web) were thermally adhered together upon exiting the thru-air oven 354. Similar laminates have been prepared with an adhesive layer 320 (e.g., a low density polyethylene of 50 g/m$^2$) positioned between the needlepunched web and the pleated carded web, and with 100% polypropylene, 6.7 dtex, 60 mm fibers without polyethylene binder fibers. In the latter case, very coarse adhesive webs had to be utilized to assist in thermal bonding of the resulting structures.

To be noted is that the macropleats of FIGS. 10D and 10E can be formed in differnet ways, other than with a lapper as previously described. For example, such pleats may be formed as air laid, wet laid or dry laid pleats using aerodynamic and/or mechanical techniques.

The foregoing webs were then subjected to testing. Table XVII shows the results of such testing, as follows:

TABLE XVII

| Sample Description | Control[a] | | Charged[a] | |
|---|---|---|---|---|
| | Filt. Eff. (%) | Δp (mm H$_2$O) | Filt. Eff. (%) | Δp (mm H$_2$) |
| FIG. 10A (without Lubricant) | 22.4 | .35 | 79.25 | .30 |
| FIG. 10A (with Lubricant) | 12.15 | .30 | 76.10 | .35 |
| FIG. 10B (without Lubricant) | 16.3 | .30 | 29.8 | .40 |
| FIG. 10B (with Lubricant) | 10.85 | .30 | 25.8 | .35 |
| FIG. 10C | 53.7 | 3.05 | 97.92 | 3.4 |
| FIG. 10D | 67.65 | 2.0 | 99.617 | 1.3 |
| FIG. 10E | 69.9 | 1.7 | 99.839 | 1.65 |
| "Filtrete"- Electret Filter (control) | | | 67.2 | 0.25 |

[a]Aerosol of NaCl having a diameter of 0.1 μm was used at a face velocity of 5.3 cm/s in filtration testing.

These results show that the pleated carded polypropylene and polyester webs adhered to the needlepunched nonwoven webs (FIGS. 10A and 10B) resulted in rather low pressure drop values of 0.30 to 0.35 mm. This low pressure drop is attributed to the fact that although these structures are typically 1.5 to 2.0 cm thick, the carded fibers in the pleated webs are predominantly oriented in a vertical plain, perpendicular to the nonwoven substrate. As a result, air can readily flow through channels developed along the lengths of the fibers.

Nevertheless, the relative bulk and depth of such structures enhance filtration efficiency. To illustrate this, the foregoing structures were electrostatically charged in accordance with the present invention and at room temperature. Filtration efficiency was then measured, yielding the results shown in Table XVII.

The filtration efficiency of the polypropylene-based staple fiber samples (FIG. 10A, unfinished and finished fibers, respectively) increased dramatically after being charging on an apparatus according to FIG. 4 (Technique II). This is so even for the finished fibers, and even though many fiber finishes absorb moisture and are believed to interfere with the electrostatic charging of such fabrics. It is significant that the results achieved with the web of FIG. 10A have a greater filtration efficiency than conventionally available "Filtrete" (3M) filters, which are used for electrostatically enhanced filters in home central air systems. Although the pressure drops exhibited by the samples of the present invention are somewhat higher than those exhibited by the "Filtrete" product, such pressure drops are generally in the same range of "low pressure drops" which are satisfactory for such applications.

The polyester samples (FIG. 10B, unfinished and finished, respectively) resulted in a somewhat lower level of filtration efficiency than did the polypropylene samples. Nevertheless, the filtration efficiency of the polyester samples was notably improved. It is believed that changes in the chemistry of the polyester fibers, as well as the shape of the resulting web, can improve the results achievable with polyester fibers beyond those shown in Table XVII. As an example, deep-grooved 4DG fibers (Eastman Chemical Company) have been treated on an apparatus according to FIG. 4 (Technique II). It was found that the resulting filtration efficiency increased from 20% to 72%. The 4DG fibers have a great deal more surface area which can accept electrostatic charging, leading to such improvements.

Testing of the webs of FIGS. 10C, 10D and 10E resulted in extremely high filtration efficiencies. The resulting filtration efficiencies (charged structures) would be satisfactory as HEPA filters in clean rooms, and for use under other stringent conditions for extremely low air contamination. The pressure drops associated with such webs are in a range which is satisfactory for such applications. The web of FIG. 10C exhibited the highest pressure drop, with the webs of FIGS. 10D and 10E showing notably lower pressure drops. These pressure drops are largely due to the greater surface area that the pleated (meltblown) surfaces of the webs present (it should be noted here that the carded webs of FIGS. 10D and 10E were not pleated before being laminated with the meltblown polypropylene web).

If desired, the foregoing composites may also be electrostatically charged with an apparatus according to FIG. 1 (Technique I), or an apparatus according to FIG. 6 (Technique III).

It is also possible to use lighter weight meltblown nonwoven webs and/or to make the meltblown fibers coarser, and to still obtain high filtration efficiencies and minimal pressure losses making use of the improvements of the present invention. Also, in laminates which employ an adhesive web (e.g., the composites of FIGS. 10C and 10D), much lighter weight adhesive webs can be used such as meltblown adhesive webs which may be applied uniformly in amounts as small as 2–4 g/m$^2$.

The excellent filtration characteristics of the folded composites of the invention together with their compression behavior (compressive rigidity and high resilience to repeated loading) give these composites a combination of unique properties. The composites also can be used for sound and thermal insulation; in combination with their filtration properties they also exhibit excellent liquid retention properties.

U.S. Pat. No. 5,401,446 is incorporated herein in its entirety by reference.

The above examples and description fully disclose the present invention including preferred embodiments thereof. The invention, however, is not limited to the precise embodiments described herein but includes all modifications encompassed with the scope and spirit of the following claims.

The appended claims set forth various novel and useful features of the invention.

What is claimed is:

1. A composite web comprised of at least two layers including a first layer formed of a carded web and folded to define a series of pleats, and a second layer formed of a nonwoven web and including a planar surface, wherein the pleats of the carded webs are attached to the planar surface of the nonwoven web.

2. The composite web of claim 1 wherein the carded web is comprised of a blend of fibers including polypropylene and polyethylene.

3. The composite web of claim 1 wherein the carded web is comprised of a blend of fibers including polyester and polypropylene.

4. The composite web of claim 1 wherein the carded web includes staple fibers.

5. The composite web of claim 1 wherein the nonwoven web is a meltblown polypropylene web.

6. The composite web of claim 1 wherein the nonwoven web is selected from the group consisting of needlepunched, spunbonded, thermally bonded, latex bonded and hydroentangled webs.

7. The composite web of claim 1 wherein the first layer is heat-bonded to the second layer.

8. The composite web of claim 1 which further comprises an adhesive web connecting the first layer and the second layer.

9. The composite web of claim 8 wherein the adhesive web is a low density polyethylene web or a lightweight meltblown web.

10. A composite web comprised of at least three layers including a first layer formed of a carded web and a second layer attached to the first layer, wherein the attached first and second layers are folded to define a series of pleats, and a third, support layer having a planar surface, wherein the pleats of the attached first and second layers are attached to the planar surface of the support layer.

11. The composite web of claim 10 wherein the second layer is a meltblown web.

12. The composite web of claim 11 wherein the meltblown web is formed of polypropylene.

13. The composite web of claim 10 wherein the support layer is a needlepunched web.

14. The composite web of claim 10 wherein the first, second and third layers are heat-bonded to each other.

15. The composite web of claim 10 which further comprises an adhesive web connecting the attached first and second layers and the support layer.

16. The composite web of claim 15 wherein the adhesive web is a low density polyethylene web or a lightweight meltblown web.

17. The composite web of claim 10 wherein the first layer is attached to the third layer.

18. The composite web of claim 10 which further comprises a fourth layer formed of a carded web, wherein the fourth layer is attached to a surface of the second layer opposing the first layer.

19. The composite web of claim 18 wherein the second layer is a meltblown polypropylene web.

20. The composite web of claim 18 wherein the support layer is a scrim net.

21. The composite web of claim 18 wherein the first, second, third and fourth layers are heat-bonded to each other.

22. The composite web of claim 18 which further comprises an adhesive web connecting the attached first, second and fourth layers and the support layer.

23. The composite web of claim 22 wherein the adhesive web is a low density polyethylene web or a lightweight meltblown web.

24. The composite web of claim 18 wherein the first layer is attached to the third layer.

25. An electrostatically charged composite web comprising at least two layers including a first layer formed of a carded web and folded to define a series of pleats, and a second layer formed of a nonwoven web and including a planar surface, wherein the pleats of the carded webs are attached to the planar surface of the nonwoven web.

26. The composite web of claim 25 wherein the carded web is comprised of a blend of fibers including polypropylene and polyethylene.

27. The composite web of claim 25 wherein the carded web is comprised of a blend of fibers including polyester and polypropylene.

28. The composite web of claim 25 wherein the carded web includes staple fibers.

29. The composite web of claim 25 wherein the nonwoven web is a meltblown polypropylene web.

30. The composite web of claim 25 wherein the nonwoven web is selected from the group consisting of needlepunched, spunbonded, thermally bonded, latex bonded and hydroentangled webs.

31. The composite web of claim 25 wherein the first layer is heat-bonded to the second layer.

32. The composite web of claim 25 which further comprises an adhesive web connecting the first layer and the second layer.

33. The composite web of claim 32 wherein the adhesive web is a low density polyethylene web or a lightweight meltblown web.

34. The composite web of claim 25 wherein the attached first and second layers are folded to define a series of pleats, and which further includes a third layer formed of a nonwoven web and including a generally planar surface, wherein the pleats of the folded first and second layers are attached to the planar surface of the nonwoven web.

35. The composite web of claim 34 wherein the first layer is heat-bonded to the third layer.

36. The composite web of claim 25 which further comprises a third layer formed of a carded web and folded to define a series of pleats, wherein the pleats of the third layer are attached to a surface of the nonwoven web opposing the planar surface which receives the first layer.

37. The composite web of claim 36 wherein the attached first, second and third layers are folded to define a series of pleats, and which further comprises a scrim layer including a generally planar surface, wherein the pleats of the first layer are attached to the planar surface of the scrim layer.

38. The composite web of claim 37 wherein the first, second and third layers, and the scrim layer, are heat-bonded to each other.

39. An electrostatically charged composite web comprised of at least three layers including a first layer formed of a carded web and a second layer attached to the first layer, wherein the attached first and second layers are folded to define a series of pleats, and a third, support layer having a planar surface, wherein the pleats of the attached first and second layers are attached to the planar surface of the support layer.

40. The composite web of claim 39 wherein the second layer is a meltblown polypropylene web.

41. The composite web of claim 39 wherein the support layer is a needlepunched web.

42. The composite web of claim 39 wherein the first, second and third layers are heat-bonded to each other.

43. The composite web of claim 39 which further comprises an adhesive web connecting the attached first and second layers and the support layer.

44. The composite web of claim 43 wherein the adhesive web is a low density polyethylene web or a lightweight meltblown web.

45. The composite web of claim 39 wherein the first layer is attached to the third layer.

46. The composite web of claim 39 which further comprises a fourth layer formed of a carded web, wherein the fourth layer is attached to a surface of the second layer opposing the first layer.

47. The composite web of claim 46 wherein the second layer is a meltblown polypropylene web.

48. The composite web of claim 46 wherein the support layer is a scrim net.

49. The composite web of claim 46 wherein the first, second, third and fourth layers are heat-bonded to each other.

50. The composite web of claim 46 which further comprises an adhesive web connecting the attached first, second and fourth layers and the support layer.

51. The composite web of claim 50 wherein the adhesive web is a low density polyethylene web or a lightweight meltblown web.

52. The composite web of claim 46 wherein the first layer is attached to the third layer.

* * * * *